US012144775B1

(12) United States Patent
Yan et al.

(10) Patent No.: US 12,144,775 B1
(45) Date of Patent: Nov. 19, 2024

(54) MASSAGE DEVICE

(71) Applicants: Dongguan Qunan Technology Co., Ltd., Guangdong (CN); Shenzhenshi Weiweima Technology Co., Ltd, Shenzhen (CN)

(72) Inventors: Bo Yan, Guangdong (CN); Ruyi Cao, Shenzhen (CN)

(73) Assignees: Dongguan Qunan Technology Co., Ltd., Dongguan (CN); Shenzhenshi Weiweima Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/401,691

(22) Filed: Jan. 1, 2024

Related U.S. Application Data

(63) Continuation-in-part of application No. 18/372,701, filed on Sep. 26, 2023, now Pat. No. 11,957,634,
(Continued)

(51) Int. Cl.
*A61H 19/00* (2006.01)
*A61H 23/00* (2006.01)
*A61H 23/02* (2006.01)

(52) U.S. Cl.
CPC ............. *A61H 19/30* (2013.01); *A61H 19/44* (2013.01); *A61H 23/0254* (2013.01); *A61H 2201/1215* (2013.01); *A61H 2201/1676* (2013.01)

(58) Field of Classification Search
CPC ........ A61H 19/00; A61H 19/30; A61H 19/32; A61H 19/34; A61H 19/40; A61H 19/44;
(Continued)

(56) References Cited

U.S. PATENT DOCUMENTS 3,939,826 A * 2/1976 Fujimoto ........... A61H 23/0254 601/111
4,046,142 A * 9/1977 Whitney ................ A61H 7/005 601/108
(Continued)

FOREIGN PATENT DOCUMENTS

CN 102429805 A 5/2012
CN 103393530 A 11/2013
(Continued)

OTHER PUBLICATIONS

English translation of CN 204319236, machine translated by Search clarivates analytics.*
(Continued)

*Primary Examiner* — Tu A Vo

(57) ABSTRACT

A massage device includes a shell, a massage member and a driving member arranged in the shell and connected to the massage member in a transmission way. The shell is configured to be inserted into a human body, and a moving space is defined in the shell and extends through a lateral wall of the shell to communicate with an outside environment out of the shell. The massage member is mounted in the moving space and rotatably connected to the shell by a pivot, and includes a plurality of massage portions arranged around the pivot. When the massage member rotates about the pivot, the plurality of massage portions of the massage member rotates to the outside environment out of the space of the shell sequentially, so as to stimulate a portion of the human body around the shell.

16 Claims, 24 Drawing Sheets

Related U.S. Application Data which is a continuation of application No. 18/118,749, filed on Mar. 8, 2023, now Pat. No. 11,771,619.

(58) Field of Classification Search
CPC ........ A61H 19/50; A61H 21/00; A61H 7/002; A61H 7/004; A61H 7/005; A61H 23/0263
See application file for complete search history.

(56) References Cited

U.S. PATENT DOCUMENTS

| | | | | |
|---|---|---|---|---|
| 7,238,163 | B1 * | 7/2007 | Fried | A61H 15/0078 601/126 |
| 8,734,321 | B1 * | 5/2014 | Weller | A61H 19/30 600/38 |
| 9,737,457 | B2 | 8/2017 | Allen | |
| 11,229,574 | B2 | 1/2022 | Haddock et al. | |
| 11,369,545 | B1 | 6/2022 | He | |
| 11,491,078 | B1 | 11/2022 | He | |
| 11,771,619 | B1 * | 10/2023 | Yan | A61H 19/44 600/38 |
| 2005/0020948 | A1 * | 1/2005 | Gueret | A45D 34/041 601/125 |
| 2010/0160840 | A1 * | 6/2010 | Murphy | A61H 7/005 601/112 |
| 2013/0178769 | A1 * | 7/2013 | Schmidt | A61H 23/0263 601/46 |
| 2013/0261385 | A1 * | 10/2013 | Zipper | A61H 23/0263 600/38 |
| 2016/0000642 | A1 * | 1/2016 | Zipper | A61H 19/34 600/38 |
| 2016/0051438 | A1 * | 2/2016 | Hahr | A61H 23/0263 601/72 |
| 2016/0120737 | A1 * | 5/2016 | Sedic | A61H 19/44 601/46 |
| 2016/0262973 | A1 * | 9/2016 | Giraud | A61N 1/322 |
| 2018/0042809 | A1 * | 2/2018 | Zipper | A61H 19/44 |
| 2020/0085681 | A1 | 3/2020 | Haddock et al. | |
| 2021/0298988 | A1 * | 9/2021 | Watts-Russell | A61F 7/02 |
| 2022/0071839 | A1 * | 3/2022 | Huang | A61H 23/02 |
| 2024/0108538 | A1 | 4/2024 | Chen | |

FOREIGN PATENT DOCUMENTS

| | | | | | |
|---|---|---|---|---|---|
| CN | 204319236 | U | * | 5/2015 | |
| CN | 204890546 | U | | 12/2015 | |
| CN | 105997454 | A | * | 12/2016 | |
| CN | 206315269 | U | * | 7/2017 | |
| CN | 206315273 | U | * | 7/2017 | |
| CN | 208756486 | U | * | 4/2019 | |
| CN | 109984932 | A | * | 7/2019 | |
| CN | 111419660 | A | | 7/2020 | |
| CN | 211095924 | U | | 7/2020 | |
| CN | 114344122 | A | | 4/2022 | |
| CN | 217409236 | U | | 9/2022 | |
| EM | 015002671-0001 | S | | 11/2022 | |
| EP | 3925588 | | | 12/2021 | |
| EP | 3925588 | A1 | | 12/2021 | |
| EP | 4406526 | A1 | | 7/2024 | |
| IT | 20100010 | A1 | | 10/2011 | |
| JP | 2006110289 | A | | 4/2006 | |
| JP | 2007296299 | A | | 11/2007 | |
| KR | 20110100506 | A | * | 9/2011 | |
| KR | 20180001751 | | | 6/2018 | |
| RU | 2742137 | | | 2/2021 | |
| WO | WO-2010083030 | A1 | * | 7/2010 | A61H 15/0078 |
| WO | 2015096179 | A1 | | 7/2015 | |
| WO | 2016103100 | | | 6/2016 | |

OTHER PUBLICATIONS

English translation of CN 208756486, machine translated by espacenet.com.*

English translation of CN 109984932, machine translated by espacenet.com.*

English translation of KR 20110100506, machine translated by espacenet.com.*

Office Action dated Feb. 5, 2024 for corresponding Russia Application No. 2023131322 along its English Translation.

Extended European Search Report Dated May 7, 2024 for corresponding European Application No. 23211161.7.

Notice of refusal of counterpart Japanese Patent Application No. 2023-200162 Issued on Jul. 9, 2024.

Notice of Public Submission of counterpart Japanese Patent Application No. 2023-200162 Issued on Aug. 20, 2024.

Supplementary document for procedures of counterpart Japanese Patent Application No. 2023-200162 Issued on Aug. 15, 2024.

Third Party Observations against European Patent Application No. 23211161.7 issued on Sep. 19, 2024.

* cited by examiner

MASSAGE DEVICE

CROSS-REFERENCE TO RELATED APPLICATIONS

This application is a continuation-in-part application of application Ser. No. 18/372,701, filed on Sep. 26, 2023, which is a continuation application of application Ser. No. 18/118,749, filed on Mar. 8, 2023, now U.S. Pat. No. 11,771,619, which claims priorities to Chinese Patent Application No. 202310081620.1, filed on Jan. 17, 2023, and Chinese Patent Application No. 202310193022.3, filed on Feb. 28, 2023. The content of the aforementioned application, including any intervening amendments thereto, are incorporated herein by reference.

TECHNICAL FIELD

The present application relates to the technical field of massage devices, and in particular to a massage device with a rotary massage member.

BACKGROUND

With the development of society and economy, the pace of life is getting faster and faster, and the pressure of work is getting higher and higher. Thus, the demand for physical relaxation is increasing, and consumer-grade massage device is becoming popular.

The massage device in the related art generally includes a motor and a massage head driven by the motor. During operation, the massage head does linear reciprocating motion to hit a part of the human body that needs to be massaged, such as the waist, the neck and the like. Such massage device is relatively simple in actions, and the massage head thereof is subject to the resistance of the massaged part of the human body during operation, so it is difficult to play good massage effect and accordingly the massage experience is not ideal.

SUMMARY

An object of the present application is to provide a massage device that is capable of playing good massage, thereby improving the massage experience.

In order to achieve the above object, a technical solution of the present application provides a massage device, including:

- a shell configured to be inserted into a human body, a moving space being defined in the shell and extending through a lateral wall of the shell to communicate with an outside environment out of the shell;
- a massage member being mounted in the moving space and rotatably connected to the shell by a pivot, the massage member including a plurality of massage portions arranged around the pivot; and
- a driving member arranged in the shell and connected to the massage member in a transmission way;
- wherein when the massage member rotates about the pivot, the plurality of massage portions of the massage member rotates to the outside environment out of the space of the shell sequentially, so as to stimulate a portion of the human body around the shell.

Compared with the prior art, the massage device according to the embodiment of the present application has a massage member with a plurality of rotatable massage portions and defines a moving space in the shell for providing sufficient space for the rotary massage portions, so that the massage device is capable of generating strong force to the massaged part even under the resistance of the massaged part, thereby playing good massage effect.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

FIG. 12 is a cross sectional view of the massage device taken along line XII-XII of

FIG. 11.

DESCRIPTION OF THE EMBODIMENTS

Figure 1:
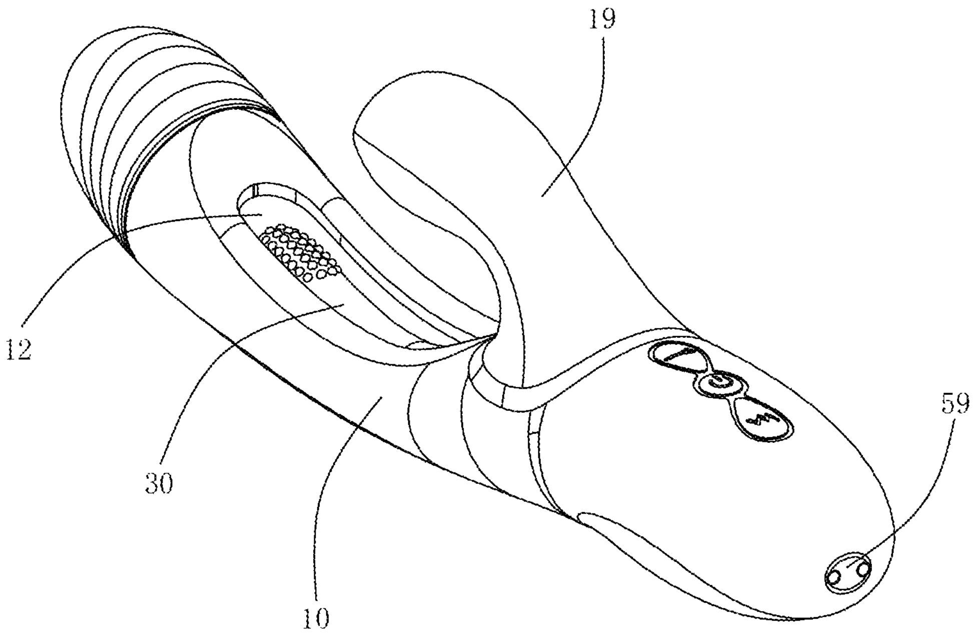
FIG. 1 is an isometric, assembled view of a massage device according to an embodiment of the present application.

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIG. 1 to FIG. 4, a massage device according an embodiment of the present application is shown. The massage device includes a shell 10, a driving member 20 mounted in the shell 10 and a massage member 30 connected to the driving member 20 in a transmission way. The shell 10 defines a moving space 12 therein. The moving space 12 extends through a lateral wall of the shell 12 and thus communicates with an outside environment. The massage member 30 extends into the moving space 12, and is rotatable relative to the shell 10 under the action of the driving member 20. During rotary of the massage member 30, a massage portion 32 of the massage member 30 is capable of extending beyond the moving space 12 of the shell 10 to the outside environment, so as to massage a corresponding part of the human body out of the shell 10.

The massage device according to this embodiment of the present application defines the moving space 12 in the shell 10, the massage member 30 extends into the moving space 12, and the driving member 20 makes the massage member 30 rotate relative to the shell 10 in the form of swinging, so that the massage portion 32 of the massage member 30, which may be a free end of the massage member 30 swings beyond the moving space 12 of the shell 10 to hit the corresponding part of the human body out of the shell 10, thereby performing massage to the human body. The design of the moving space 12 in the shell 10 provides sufficient space for the swinging of the massage member 30, and thus the massage device is capable of generating strong force to the massaged part even under the resistance of the massaged part, thereby playing good massage effect.

Preferably, the massage member 30 is an elastic structure and is capable of generating deformation when it hits the massaged part, so that the shape of the massage portion 32 may be deformed to match with the shape of the massaged part. In this way, a contact area of the massage portion 32 and the massaged part is enlarged, and thus the massage effect is further improved.

In some embodiments, the massage member 30 in whole may be made of soft materials, such as silica, rubber and the like. In some embodiments, an outer portion of the massage member 30 for touching the massaged part is made of soft materials, and an inner portion of the massage member 30 embedded in the outer portion is made of hard materials, such as plastic, metal and etc.

Figure 4:
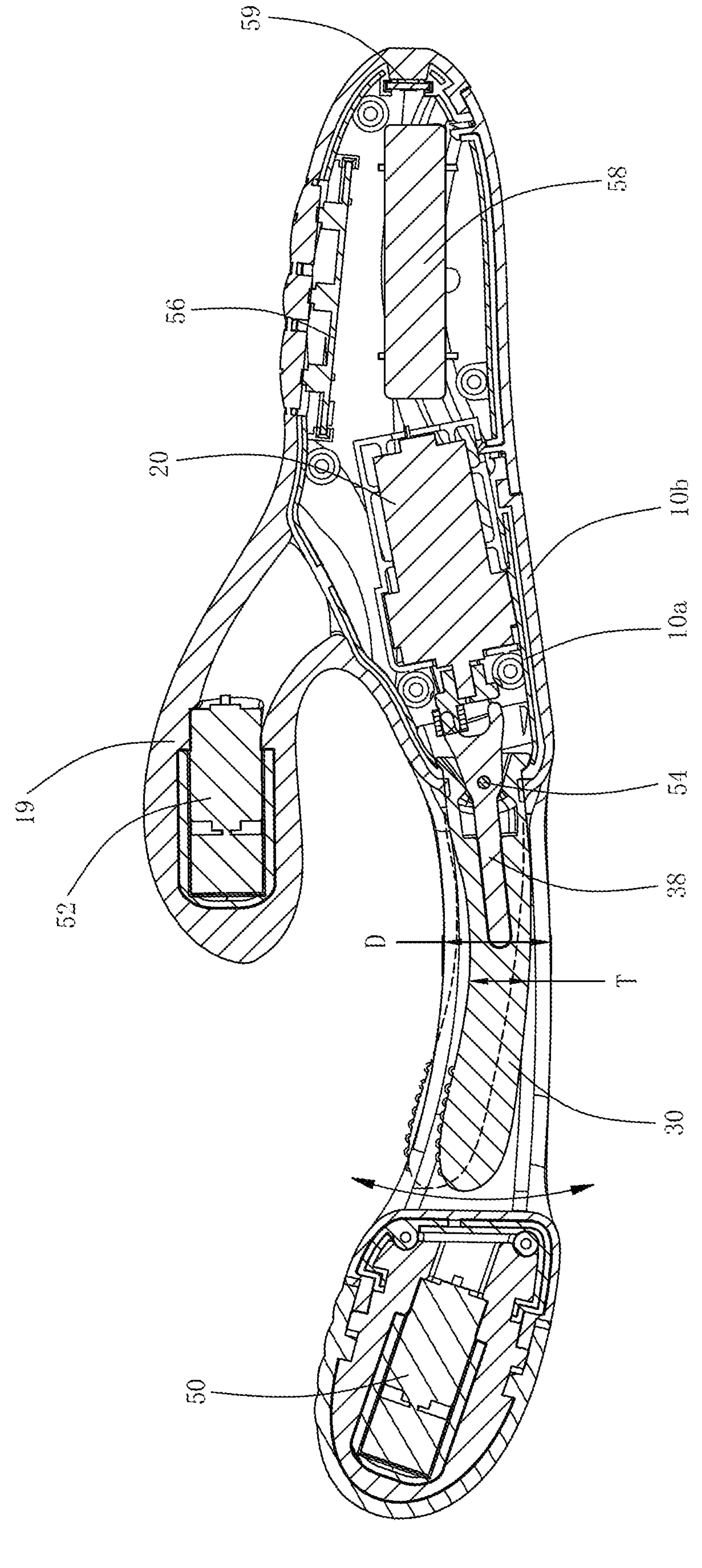
FIG. 4 is a cross sectional view of the massage device taken along ling IV-IV of FIG. 3.

As shown in FIG. 4, the massage member 30 swings in the moving space 12 along the depth direction to up and down in the moving space 12. Preferably, the thickness T of the massage member 30 is less than the depth D of the moving space 12/the thickness of the shell 10, and the massage member 30 is totally received in the moving space 12 when it is not work. The thickness difference between the massage member 30 and the shell 10 provides a space therebetween along the swinging direction of the massage member 30, and thus the massage member 30 is capable of swinging even the massaged part is nestled to an outer surface of the shell 10, thereby ensuring the massage effect.

In this embodiment, the massage member 30 is generally elongated and column-shaped. The thickness T of the massage member 30 is preferably 1 mm-150 mm, the width of the massage member 30 is preferably 1 mm-150 mm, and the length of the massage member 30 is preferably 5-150 mm, so as to make the touching area of the massage member 30 appropriate when it hit the massaged part. One end of the massage member 30 is connected to the driving member 20, and another end (i.e., the free end) of the massage member 30 acts as the massage portion 32, swinging out of the moving space 12 to hit the massaged part. The entire massage member 30 is constructed as a single pendulum, and the massage portion 32 may obtain a big swing amplitude even the swing angle of the massage member 30 is small.

In this embodiment, the massage portion 32 is formed as the free end of the massage member 30, however, in other embodiments, the massage portion 32 may also be a portion other than the free end, for example, a middle portion of the massage member 30. In some other embodiments, a plurality of massage portions 32 may be provided.

Preferably, a plurality of bulges 34 are formed on an outer surface of the massage portion 32 of the massage member 30 for improving stimulation to the massaged part. Alternately, the bulges 34 may be formed on the entire outer surface of the massage member 30. Preferably, the bulges 34 are integrally formed with the massage member 30, for example by injection molding. Alternately, the bulges 34 may be formed separately and then assembled to the massage member 30 by bonding.

Figure 3:
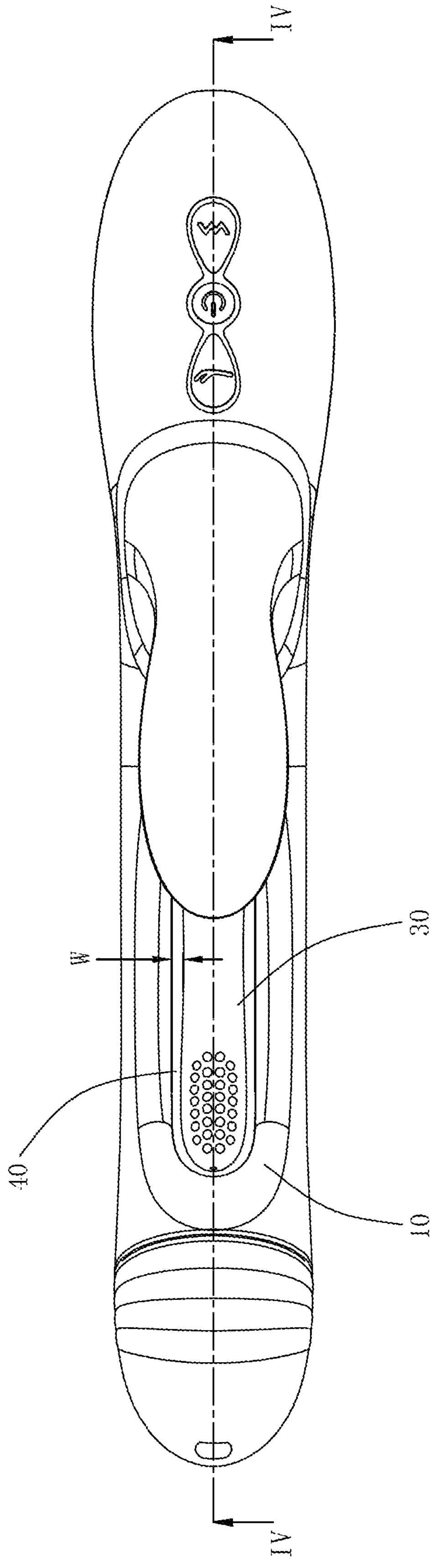
FIG. 3 is a top plane view of the massage device of FIG. 1.

As shown in FIG. 3, the massage member 30 is less than the moving space 12 of the shell 10 in lateral dimensions, and a gap 40 is defined between an outer surface of the massage member 30 and an inner surface of the shell 10 surrounding the moving space 12. The gap 40 makes the swinging of the massage member 30 in the moving space 12 not interfere with the shell 10. On the one hand, the width W of the gap 40 is designed to be not less than 0.5 mm to ensure that the massage member 30 swings freely in the moving space 12, and on the other hand, the width W of the gap 40 is designed to be less than 100 mm to avoid wasting space and reduce the entire dimensions of the massage device. In specific embodiments, the width W of the gap 40 may be 0.5 mm, 1.5 mm, 3 mm, . . . , 50 mm, . . . , 99 mm or 100 mm.

In this embodiment, the moving space 12 has a shape similar to that of the massage member 30. The width W of the gap 40 between the outer surface of the massage member 30 and the inner surface of the shell 10 is substantially constant along a circumferential direction. Specifically, the moving space 12 is generally race-track shaped. The inner surface of the shell 10 is continuous along the circumferential direction, and the moving space 12 is closed circumferentially.

In this embodiment, the moving space 12 is a through hole extending through two opposite lateral sides (top and bottom sides as viewed from FIG. 2) of the shell 10. In this case, the depth D of the moving space 12 is the same as the thickness of the shell 10, preferably ranges from 1 mm to 100 mm. During operation, the massage member 30 swings along the depth direction of the moving space 12, which can not only swing upwardly to the outside of the shell 10, but also swing downwardly to the outside of the shell 10. That is, the massage member 30 is capably of massaging two different parts of the human body which are located at two opposite outer sides of the shell 10 at the same time, which is more suitable for use in the human body to stimulate the cavity, such as the vagina.

In other embodiments, the moving space 12 may be a blind hole extending through only one side, such as the top side of the shell 10. In this situation, the depth D of the moving space 12 is less than the thickness of the shell 10. The massage device with the blind hole is more suitable for massaging the body surface, such as the waist, the neck and the like. It should be noted that the massage device with the blind hole may also be used for massaging the cavity of the human body, and the massage device with the through hole may also be used for massaging the body surface.

In other embodiments, as shown in FIG. 5*a* to FIG. 5*j*, the moving space 12 may have a shape different from that of the massage member 30, and thus the width W of the gap 40 may be variable along the circumferential direction.

Figure 5A:
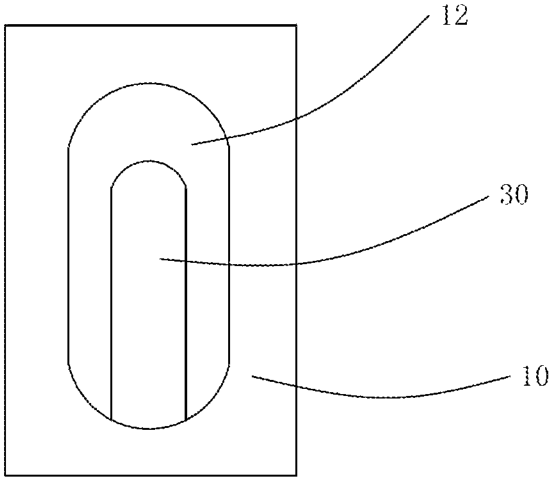
FIG. 5*a* is a schematic view of a moving space of the massage device.
Figure 5B:
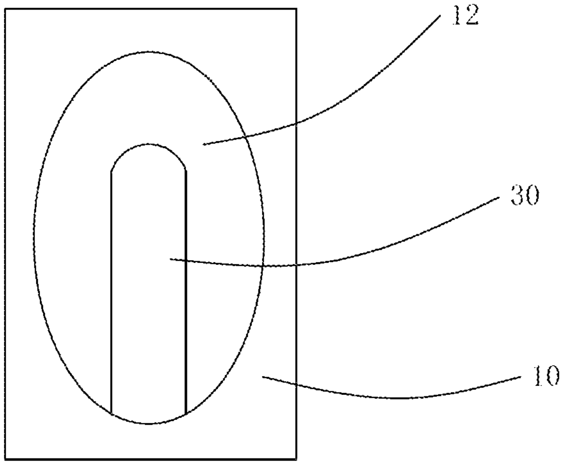
FIG. 5*b* shows a second embodiment of the moving space.
Figure 5C:
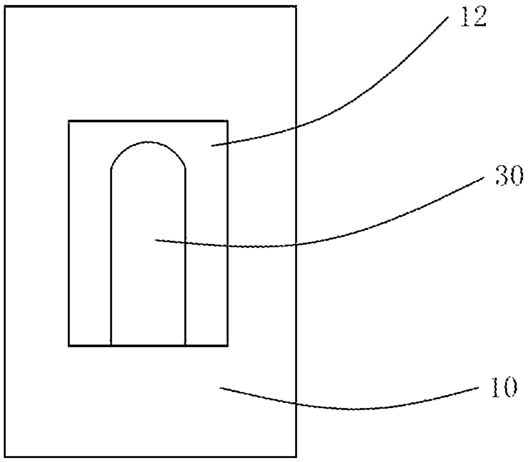
FIG. 5*c* shows a third embodiment of the moving space.
Figure 5D:
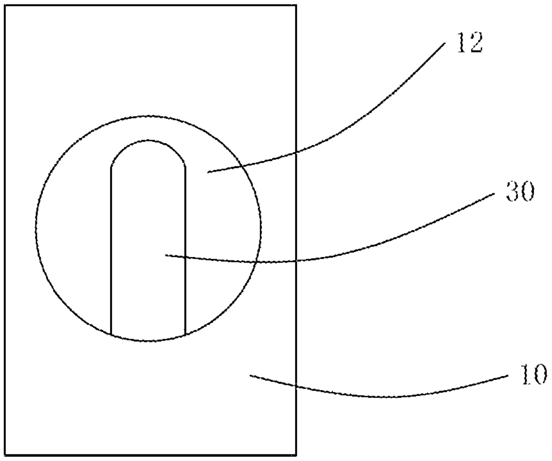
FIG. 5*d* shows a fourth embodiment of the moving space.
Figure 5E:
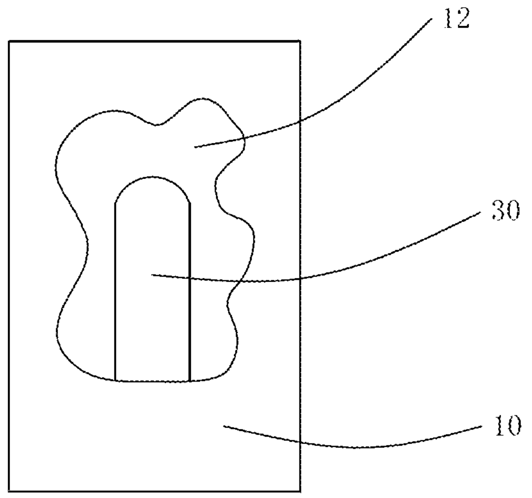
FIG. 5*e* shows a fifth embodiment of the moving space.
Figure 5F:
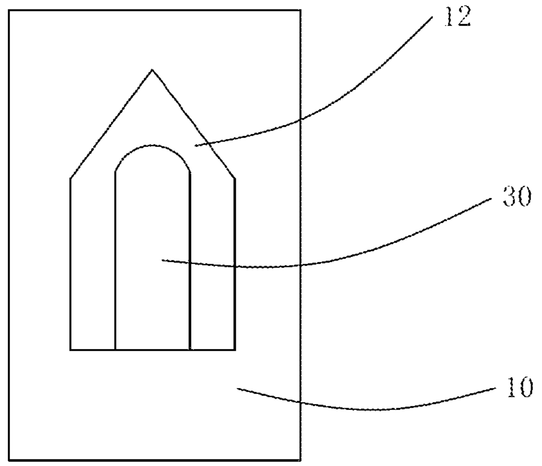
FIG. 5*f* shows a sixth embodiment of the moving space.

The shape of the moving space 12 may be regular or irregular, specifically may be any one of circle, semicircle, ellipse, square, rectangle, triangle, polygon, D-shape, C-shaped, kidney-shaped, heart-shaped, gourd-shaped, briolette, and etc., or may be a combination of at least two of them. For example, the moving space 12 shown in FIG. 5*a* is generally kidney-shaped, the moving space 12 shown in FIG. 5*b* is generally elliptical, the moving space 12 shown in FIG. 5*c* is generally rectangular, the moving space 12 shown in FIG. 5*d* is generally circular, the moving space 12 shown in FIG. 5*e* is generally irregular, the moving space 12 shown in FIG. 5*f* is generally a combination of a triangle and a rectangle. It should be understood that the shape of the moving space 12 may be set according to needs, which is not limited to the embodiments.

Figure 5G:
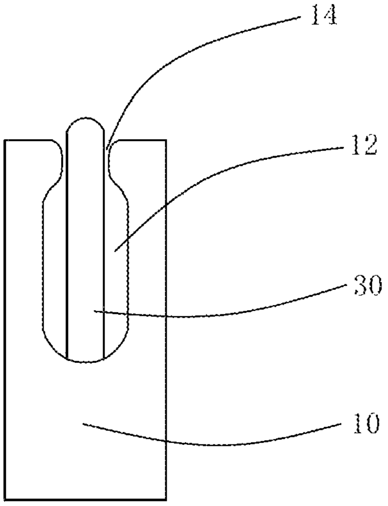
FIG. 5*g* shows a seventh embodiment of the moving space.
Figure 5H:
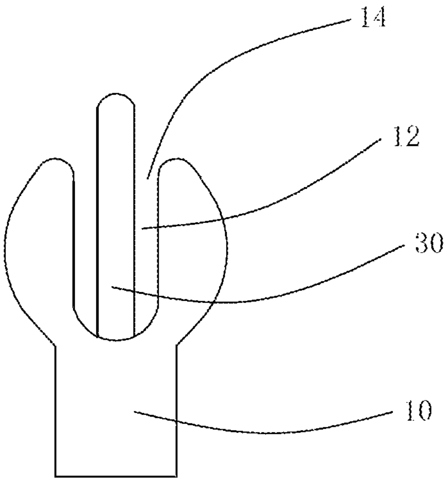
FIG. 5*h* shows an eighth embodiment of the moving space.

Further, the moving space 12 may be open in the circumferential direction. That is, the inner surface of the shell 10 surrounding the moving space 12 is discontinuous along the circumferential direction. As shown in FIGS. 5*g* and 5*h*, a circumferential opening 14 is defined in the shell 10 and communicates with the moving space 12. The circumferential opening 14 is aligned with the massage portion 32 along the longitudinal direction of the massage member 30, and the massage portion 32 extends out of the moving space 12 through the circumferential opening 14. In this case, not only the top and/or bottom sides, but also the massage portion 32 of the massage member 30 are capable of hitting corresponding parts of the human body, which means that the area being massaged at the same time is further increased.

Figure 5I:
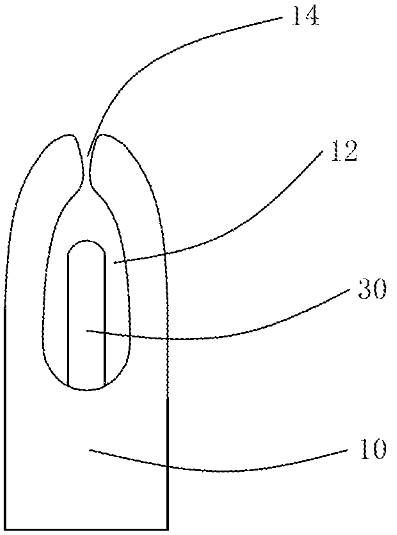
FIG. 5*i* shows a ninth embodiment of the moving space.
Figure 5J:
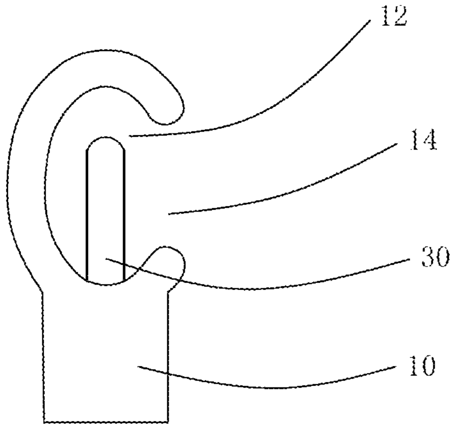
FIG. 5*j* shows a tenth embodiment of the moving space.

Alternately, the entire massage member 30 may be accommodated in the moving space 12 even the moving space 12 is open circumferentially. FIG. 5*i* shows that the moving space 12 is generally briolette and open circumferentially, whilst the entire massage member 30 is in the moving space 12. In addition, the massage member 30 accommodated in the moving space 12 may be deviated from the circumferential opening 14. FIG. 5*i* shows that the moving space 12 is generally C-shaped, and the massage member 30 is generally column-shaped and arranged parallel to the circumferential opening 14 of the moving space 12.

The shape of the massage member 30 may be regular or irregular, specifically may be any one of circle, semicircle, ellipse, square, rectangle, triangle, polygon, D-shape, C-shaped, kidney-shaped, heart-shaped, gourd-shaped, branch-shaped, and etc., or may be a combination of at least two of them. The shape of the massage member 30 and the shape of the moving space 12 can be selected arbitrarily, as long as the massage member 30 is movable in the moving space 12. FIGS. 5*a*-5*j* show the moving spaces 12 of different shapes with the same massage member 30. It should be noted that the present application does not impose any restrictions on the shapes of the moving space 12 and massage member 30, and does not impose any restrictions on the combination of the shapes of the moving space 12 and massage member 30.

Referring to FIG. 1 again, the shell 10 is elongated and the moving space 12 is defined in a middle portion of the shell 10 along the longitudinal direction. Preferably, the moving space 12 in the middle portion of the shell 10 is closed circumferentially, and the shell 10 forms two support arms 16 at two opposite lateral sides (i.e., left and right sides) of the moving space 12. The support arms 16 enhance the strength of the shell 10 and thus can provide effective support for the massage member 30 even it swings rapidly and/or greatly. Preferably, the width of the support arm 16 ranges from 1 mm to 150 mm, which is conducive to the miniaturization of the massage device, particularly miniaturization of the diameter of the massage device, so that the massage device can be used for massage of narrow and small parts, such as the cavity of the human body.

The shell 10 may be designed to have an outer profile according to its application scenarios. When the massage device is used in the human body, such as inserted into the female vagina, the shell 10 may be shaped as the male penis, as shown in FIGS. 1-4. When the massage device is used out of the human body, the shell 10 may be any shape, such as column-shaped, block-shaped, disc-shaped, branch-shaped, and etc.

Figure 2:
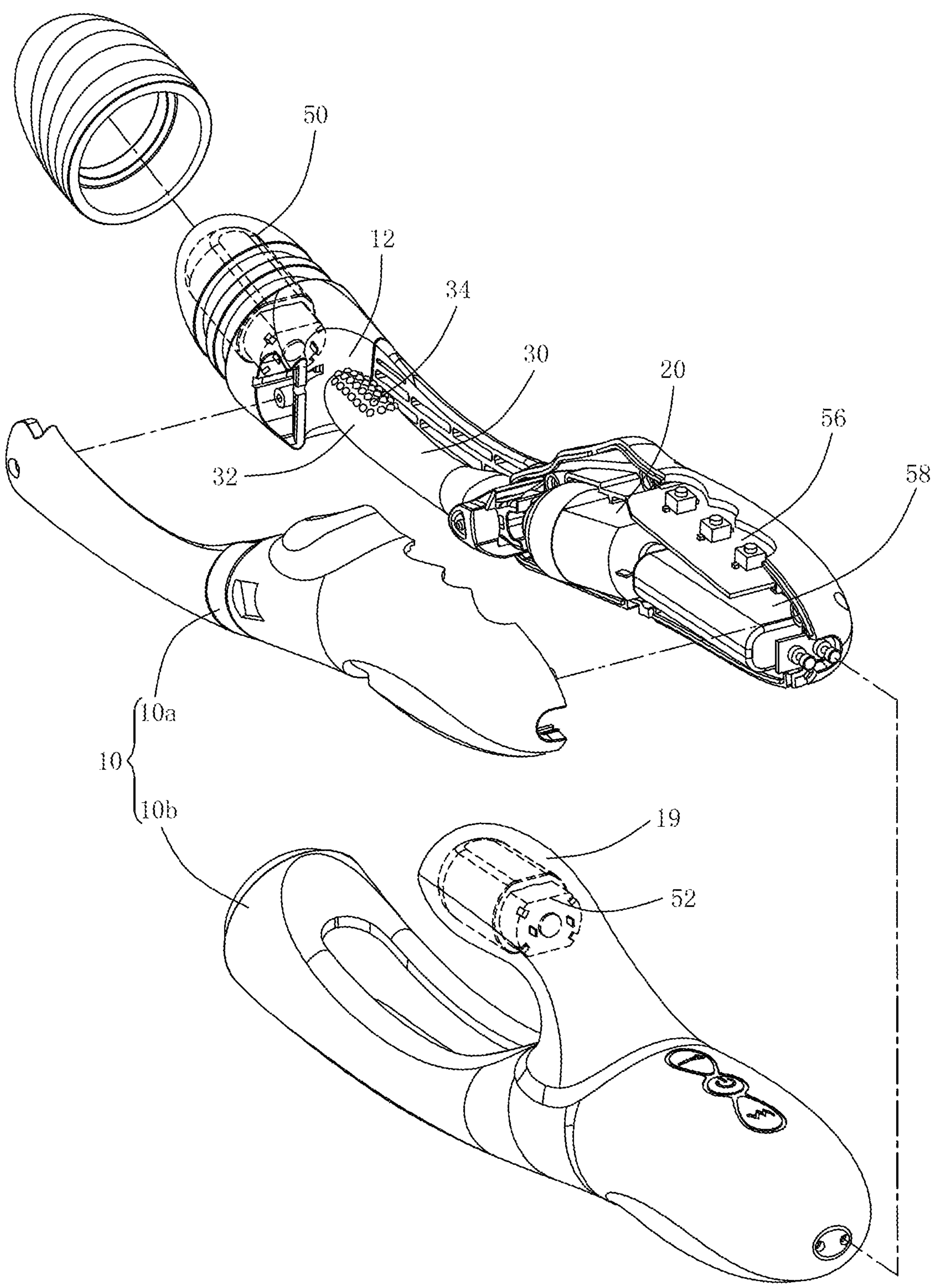
FIG. 2 is an isometric, exploded view of the massage device of FIG. 1.

As shown in FIG. 2, in this embodiment, the shell 10 is a double-layer structure, and includes an inner shell 10*a* and an outer shell 10*b* covering the whole inner shell 10*a*. The inner shell 10*a* is made of hard materials, such as plastic, metal, wood, and etc. The outer shell 10*b* is made of soft materials, such as silicone, rubber, and etc. The inner shell 10*a* inside the outer shell 10*b* not only provides support for the outer shell 10*b*, but also provides a receiving space for mounting the driving member 20. The outer shell 10*b*, which is used to touch the massaged part directly, preferably has a smooth outer surface, thereby the massage device in whole has high strength and comfortable use experience.

In this embodiment, the inner shell 10*a* is formed by injection molding as two pieces and then assembly together by snap-fitting, screws, and etc., which facilitates assembly of the elements inside the shell 10, such as the driving member 20. The outer shell 10*b* is formed by 2nd injection molding as one piece and covering the inner shell 10*a* after the inner shell 10*a* and the elements inside the inner shell 10*a* are assembled together. The integral outer shell 10*b* is beneficial to the waterproof and dustproof of the present massage device, so that the massage device can be used underwater or in the cavity of the human body.

In other embodiments, the inner shell 10*a* may be molded as one piece. In this case, elements mounted inside the inner shell 10*a* are arranged in the mold and then injects the inner shell 10*a*. Alternately, the outer shell 10*b* may be molded as two or more pieces and then assembled together. In this case, the shell 10 is detachable for replacing elements therein, which is good for maintenance of the massage device. The inner shell 10*a* may be the same as the outer shell 10*b*, and thus the shell 10 has two different layers in any positions. Alternately, the inner shell 10*a* may be different from the outer shell 10*b* in local areas, and thus the local areas of the shell 10 may be one layer, i.e., without the layer of the hard inner shell 10*a*.

Preferably, the moving space 12 is defined at a position of the soft outer shell 10*b* with the hard inner shell 10*a* formed therein, thus the solid portion surrounding the moving space 12 is constructed of two layers and the strength thereof is high enough to support the swinging of the massage member 30. It should be understood that: in some cases where the requirements for the use environment are not high, the moving space 12 may be formed at a position of the outer shell 10*b* without the inner shell 10*a* formed therein. In other embodiments, the shell 10 may be a single-layer structure with certain hardness.

Figure 6:
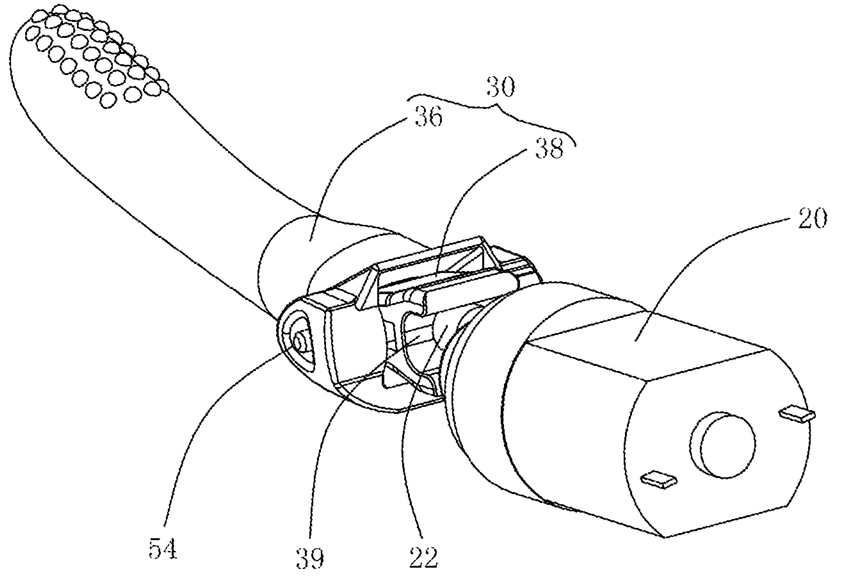
FIG. 6 is an isometric, assembled view of a massage module of the massage device of FIG. 1.
Figure 7:
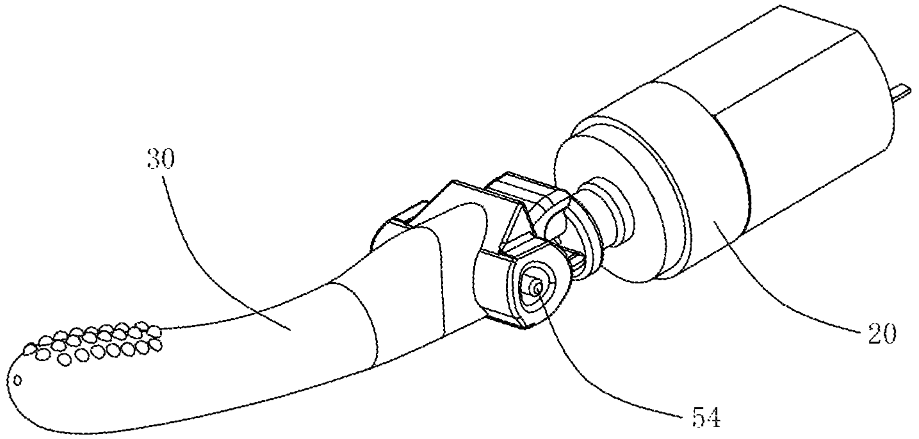
FIG. 7 shows the massage module of FIG. 6 from another aspect.
Figure 8:
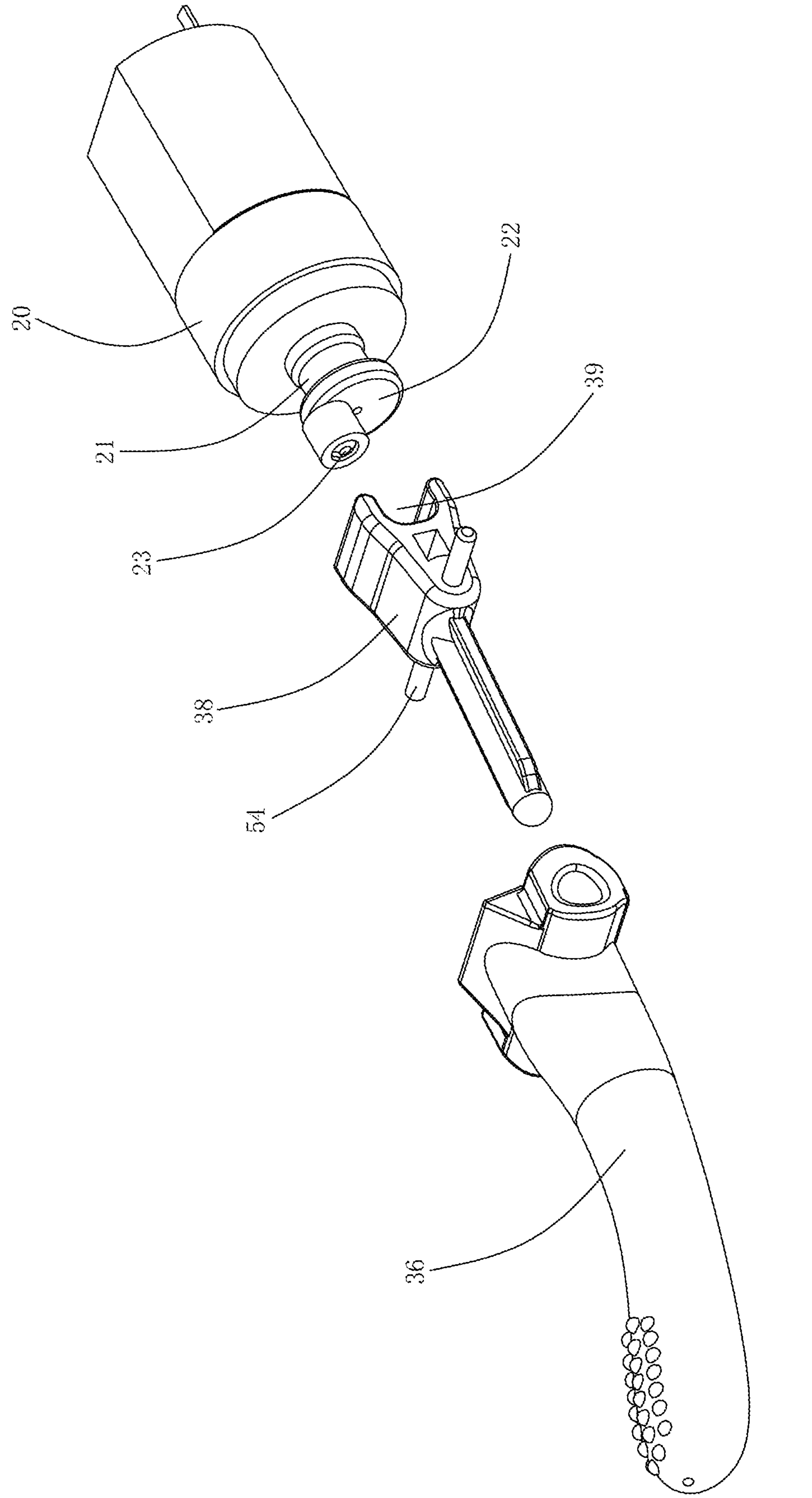
FIG. 8 is an exploded view of the massage module of FIG. 7.

Referring to FIGS. 6-8, the driving member 20 is used to generate power to make the massage member 30 swing relative to the shell 10, which can be a rotary motor and the like. Preferably, a transmission member 22 is arranged between the driving member 20 and the massage member 30. The transmission member 22 may be gear mechanism, pulley mechanism, crank mechanism, cam mechanism, turbine mechanism, and etc., which not only transmits power from the driving member 20 to the massage member 30, but also change the movement mode therebetween, such as change the rotation of the driving member 20 to the swinging of the massage member 30.

In this embodiment, the driving member 20 is a rotary motor, and the transmission member 22 is a cam. The rotary motor 20, the cam 22 and the massage member 30 cooperatively construct a massage module. A rotary shaft 21 of the rotary motor 20 is connected to a central portion of the cam 22, and a driving shaft 23 extends out from a periphery of the cam 22 to connect the massage member 30. Both the rotary shaft 21 and driving shaft 23 extend generally parallel to the longitudinal direction of the shell 10, but the driving shaft 23 is eccentric with respect to the rotary shaft 21. During rotation of the driving shaft 23, the driving shaft 23 revolves around the rotary shaft 21 to generate movement along both the thickness direction and the width direction of the shell 10.

In this embodiment, the massage member 30 includes a soft cover 36 and a hard core 38 embedded in the soft cover 36. The hard core 38 defines a groove 39 at an end thereof adjacent to the driving member 20 for receiving the driving shaft 23, and the groove 39 is configured that movement of the driving shaft 23 along the thickness direction is limited, while movement of the driving shaft 23 along the width direction is allowed. For example, a size of the groove 39 in the width direction is much larger than the diameter of the driving shaft 23, and a size of the groove 39 in the thickness direction is equal to or slightly larger than the diameter of the driving shaft 23. In this way, the driving shaft 23 is capable of driving the hard core 38 to move upwardly and downwardly, in turn driving the massage member 30 to swing along the thickness direction to the outside environment.

Two opposite lateral sides of the hard core 38 are rotatably connected to the shell 10, preferably to the inner shell 10*a* by a pivot 54. The pivot 54 is arranged adjacent to the groove 39, thereby the massage portion 32 of the massage member 30 has a greater swing amplitude. The pivot 54 may be integrally formed with the inner shell 10*a* or the hard core 38, or may be formed separately and then assembled to the inner shell 10*a* and the hard core 38. Preferably, the hard core 38 has a length not less than a half of the soft cover 36. That is, the hard core 38 at least extends to a middle portion of the soft cover 36, providing sufficient support for the soft cover 36 and being conducive to driving the massage portion 32 of the soft cover 36 to swing about the pivot 54.

The massage member 30 connected to the shell 10 at a position adjacent to an end thereof connected to the driving member 20 makes the massage member 30 as a simple pendulum, so that the massage portion 32 at the free end of the massage member 30 away from the driving member 20 have a greater swing amplitude even the swing angle of the massage member 30 is small.

Referring to FIGS. 2 and 4, the massage device further includes a first vibration member, such as a first vibration motor 50. The first vibration motor 50 is arranged in a front end of the shell 10 for generating high-frequency vibration. When the massage device is used, for example, in the vaginal of the human body, the first vibration member 50 in the front end of the shell 10 generates vibration effect to the vaginal wall, and the massage member 30 generates scratch effect to the vaginal wall at the same time, which can multiply the stimulation effect to the users.

Referring to FIGS. 2 and 4, the massage device further includes a second vibration member, such as a second vibration motor 52. The second vibration motor 52 is arranged in a branch 19 of the shell 10 which extends curvedly from a rear end of the moving space 12 of the shell 10 to an upper side of the massage member 30. When the massage device is used in the vagina, the first vibration member 50 in the front end of the shell 10 generates vibration effect to the vaginal wall, the massage member 30 generates scratch effect to the vaginal wall, and the second vibration member 52 in the branch 19 of the shell 10 generates vibration effect to the clitoris, which can maximize the stimulation effect to the users.

Referring to FIGS. 2 and 4 again, the massage device further includes a control member 56, such as a control circuit board mounted in the shell 10. The control member 56 is electrically connected to the rotary motor 20 and the vibration motors 50, 52 for controlling their operation according to the user's instructions, such as controlling the frequency of the vibration motors 50, 52, controlling the rotary speed of the rotary motor 20, and etc.

Preferably, a battery 58 is arranged in the shell 10 and connected to the circuit board 56 electrically. The battery 58 supplies electric power to the motors 20, 50, 52 through the circuit board 56. Preferably, the battery 58 is a rechargeable battery, and a corresponding charging interface 59 may be provided at a rear end of the shell 10 to connect external power supply to charge the battery 58.

The massage device according to this embodiment defines the moving space 12 in the shell 10 for providing sufficient space for the swinging of the massage member 30, so that the massage device 30 is capable of generating strong force to the massaged part even under the resistance of the massaged part, thereby playing good massage effect. Further, the massage device is provided with vibration motors 50, 52 for generating high high-frequency vibration, further improving the massage effect.

Figure 9:
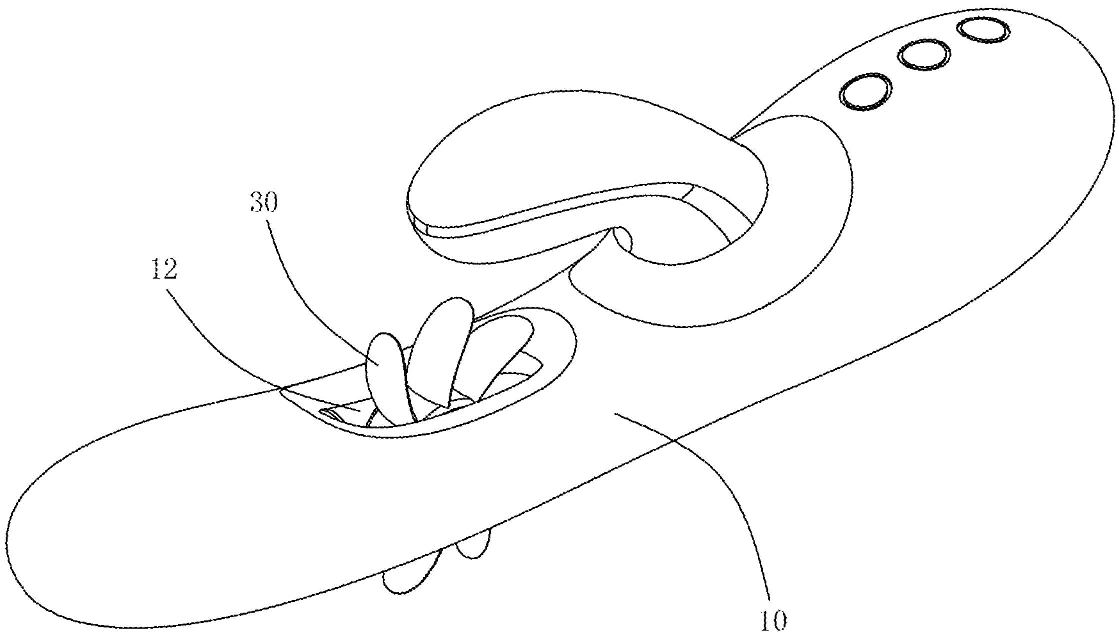
FIG. 9 is an isometric, assembled view of a massage device according to a second embodiment of the present application.
Figure 10:
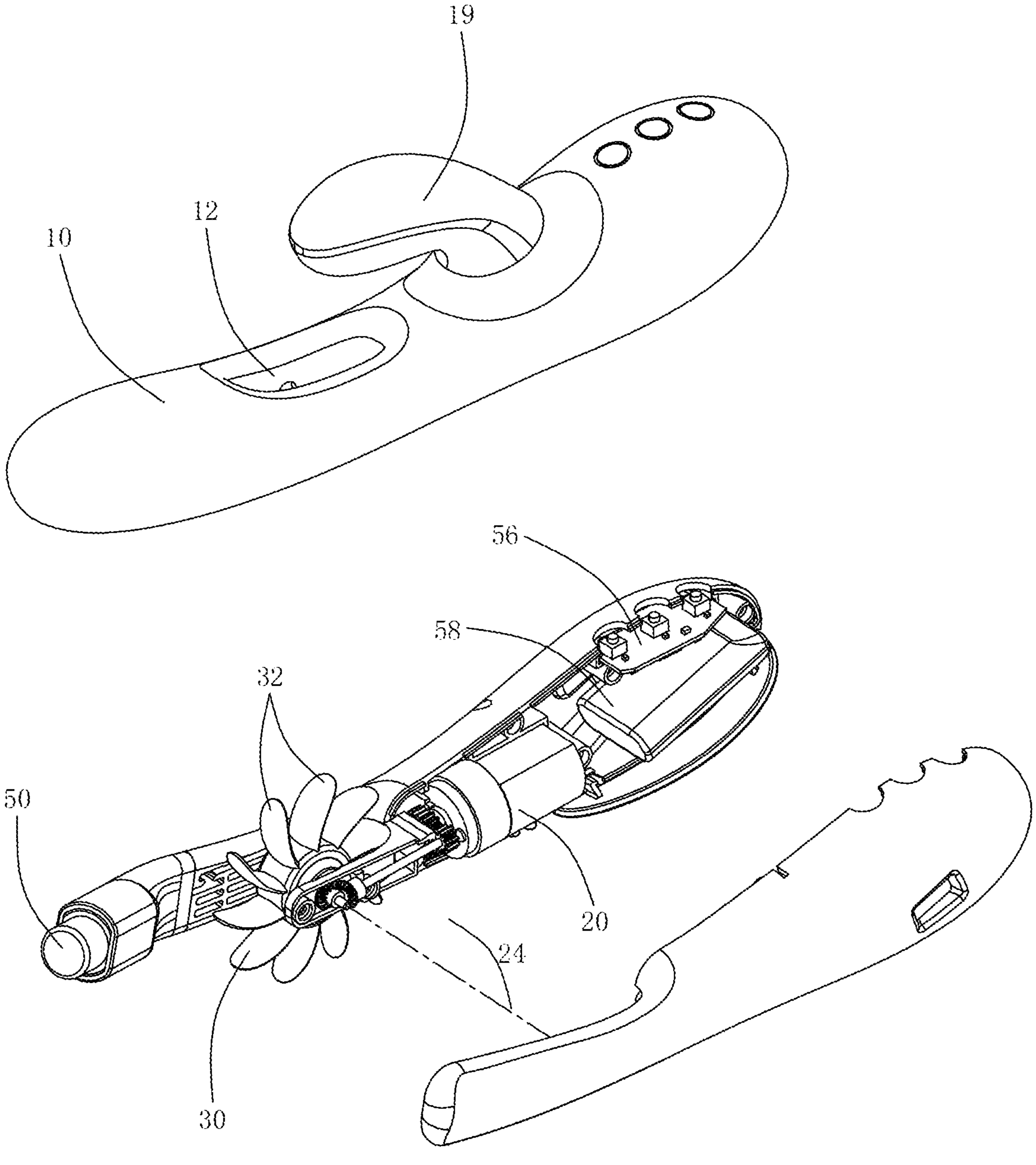
FIG. 10 is an isometric, exploded view of the massage device of FIG. 9.

Referring to FIGS. 9-10, a massage device according to a second embodiment of the present application is shown. The massage device includes a shell 10 defining a moving space 12 therein, a massage member 30 accommodated in the moving space 12, and a driving member 20 mounted in the shell 10 and connected to the massage member 30 in a transmission way. The moving space 12 extends laterally through the shell 10, two openings are defined in two opposite sides (such as top and bottom sides) of the shell 10 to intercommunicate the moving space 12 with the outside environment. A difference between the massage device of this embodiment and that of the first embodiment is mainly in the massage member 30.

Figure 14:
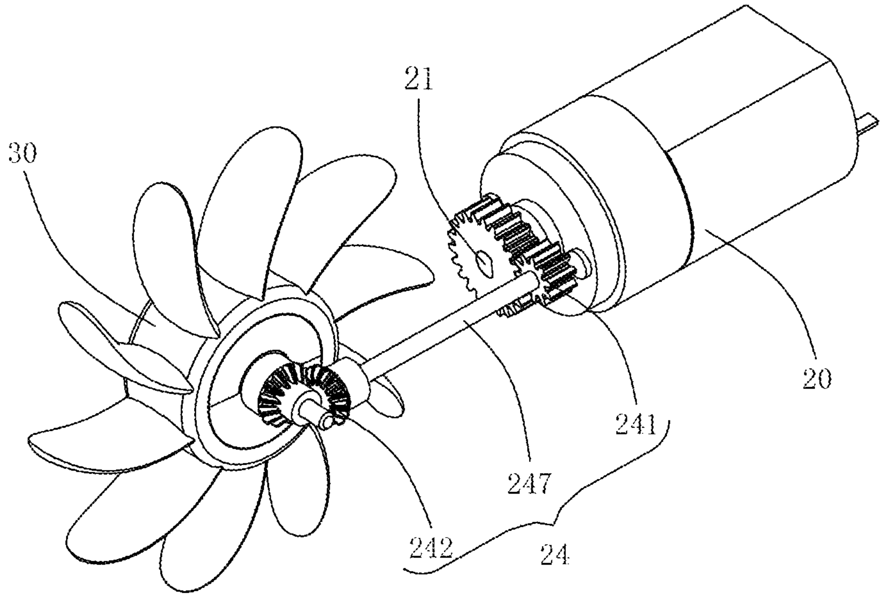
FIG. 14 is an isometric, assembled view of a massage module of the massage device of FIG. 9.
Figure 15:
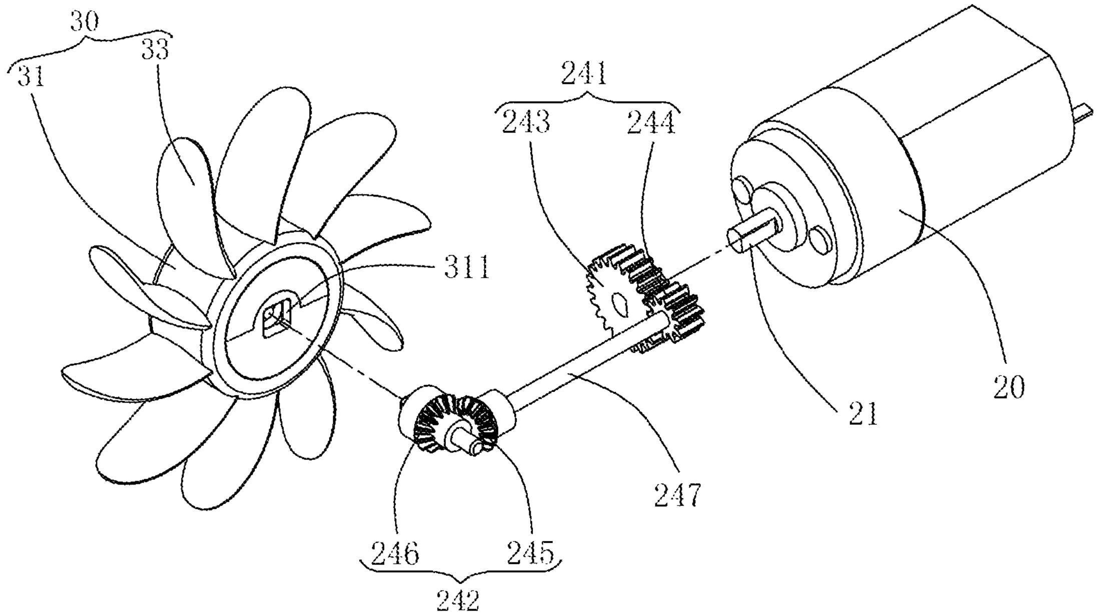
FIG. 15 is an exploded view of the massage module of FIG. 14.
Figure 16:
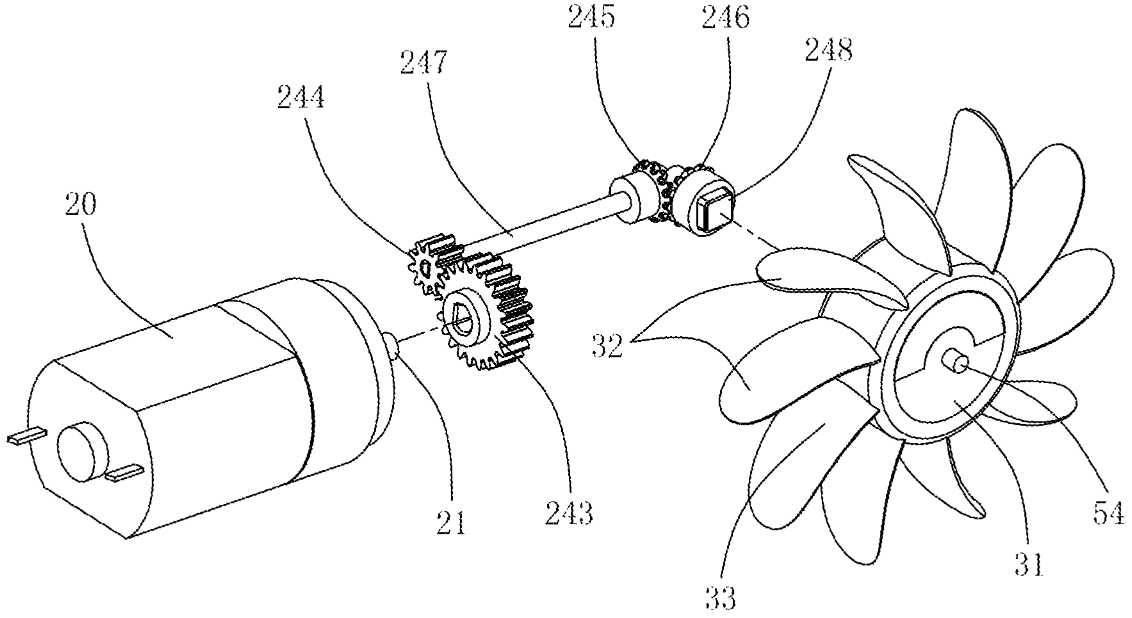
FIG. 16 shows the massage module of FIG. 15 from another aspect.

In this embodiment, as shown in FIGS. 14-16, the massage member 30 in whole is constructed as an impeller, and includes a hub 31 and a plurality of blades 33 extending outwardly and radially from the hub 31. The blades 33 and the hub 31 may be formed separately and then assembled together, or may be integrally formed as one piece. The hub 31 is rotatably connected to the support arm 14 of the shell 10 by a first pivot 54, and the blades 33 are arranged around the hub 31 and spaced from each other. Each blade 33 has an inner end connected to the hub 31 and an outer free end away from the hub 31. The free end of each blade 33 is configured as a massage portion 32 of the massage member 30.

Figure 11:
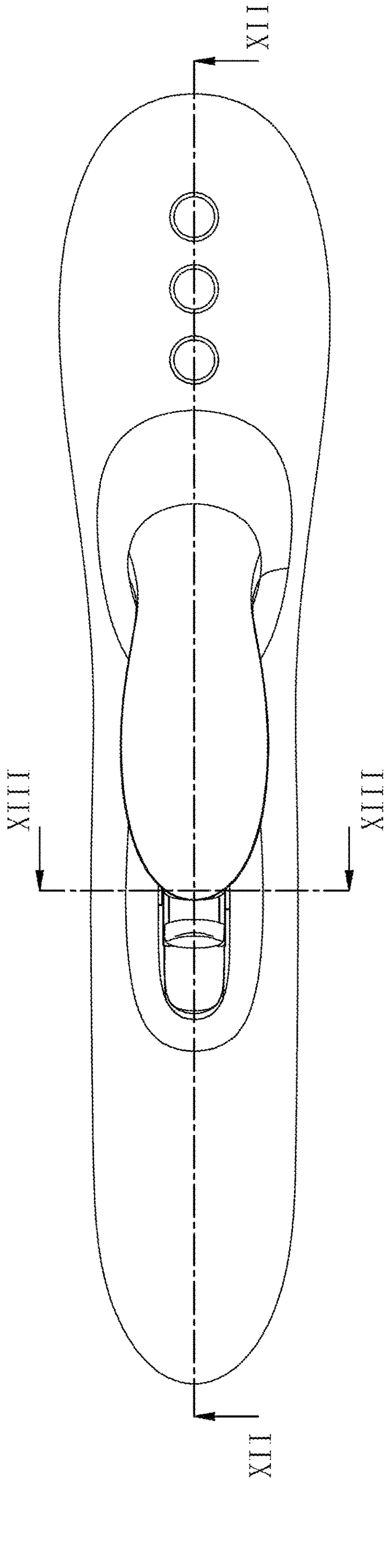
FIG. 11 is a top plan view of the massage device of FIG. 9.
Figure 12:
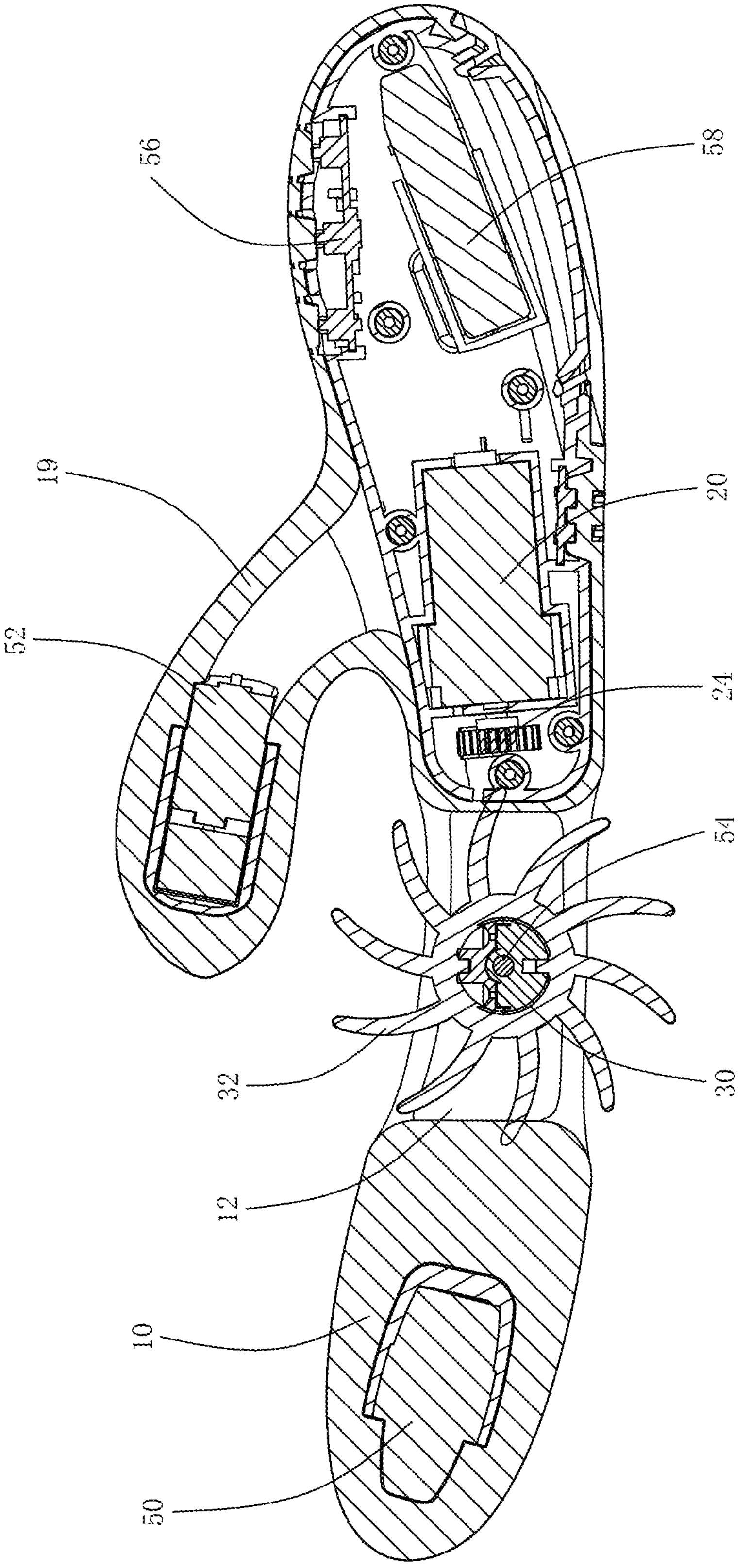
Figure 13:
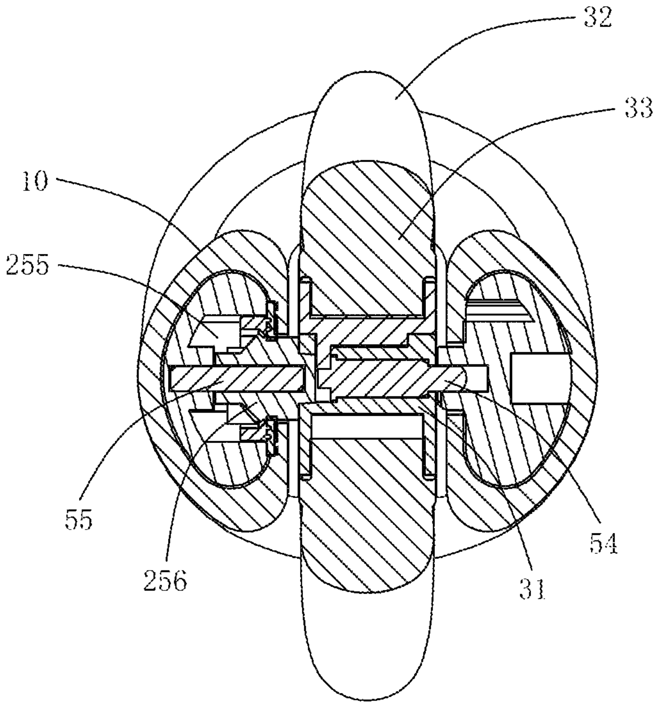
FIG. 13 is a cross sectional view of the massage device taken along line XIII-XIII of FIG. 11.

As shown in FIG. 11 to FIG. 13, the massage member 30 in whole has a diameter larger than the depth of the moving space 12 of shell 10, and some of the massage portions 32 of the blades 31 extend beyond the moving space 12 to the outside environment. In this embodiment, the moving space 12 extends through top and bottom sides of the shell 10, and some massage portions 32 of the blades 31 extend beyond the moving space 12 to the upper side of the shell 10, and some massage portions 32 of the blades 31 extend beyond the moving space 12 to the lower side of the shell 10.

During operation, the driving member 20 is started and the massage member 30 is thus driven to rotate about the first pivot 54. During rotation of the massage member 30, each blade 33 may rotate to a position where it is totally accommodated inside the moving space 12, or may rotate to a position that the massage portion 32 thereof extends beyond the moving space 12 to the outside environment. That is, the massage portions 32 of the blades 33 of the rotary massage member 30 scratch a part of the human body nestled to the outer surface of the shell 10 sequentially, such as scratch the vaginal wall when the massage device is inserted into the vagina of the women, thereby generating stimulation effect to help the women to release their sexual pressure.

Referring to FIGS. 14-16, the driving member 20 may be a rotary motor, and a transmission unit 24 is connected between the driving member 20 and the massage member 30 for power transmitting. The transmission unit 24 includes a first gear unit 241 and a second gear unit 242. The first gear unit 241 includes a first gear 243 and a second gear 244 which are meshed with each other. The second gear unit 242 includes a third gear 245 and a fourth gear 246 which are meshed with each other. The first gear 243 is fixedly connected to a rotary shaft 21 of the rotary motor 20, the fourth gear 246 is fixedly connected to the hub 31 of the massage member 30, and second gear 244 and third gear 245 are coaxial and connected together by a connecting rod 247.

As shown in FIG. 16, a block 248 is provided at a side of the fourth gear 246 facing towards the massage member 30, and a mounting hole 311 (as shown in FIG. 15) is defined at a central portion of the hub 31 for accommodating the block 248 therein. Preferably, the mounting hole 311 and the block 248 are non-circular shaped, such as rectangular shaped, so that the massage member 30 can rotate together with the fourth gear 246 for the engagement of the block 248 inside the mounting hole 311.

In this embodiment, the first gear 243 and second gear 244 are spur gears, and the third gear 245 and fourth gear 246 are bevel gears. By means of such transmission unit 24, a rotary axis of the massage member 30, which extends substantially along the lateral direction of the shell 10, is generally perpendicular to that of the rotary shaft 21 of the driving member 20, which extends substantially along a longitudinal direction of the shell 10.

In this embodiment, the fourth gear 246 is rotatably connected to the shell 10 by a second pivot 55. The second pivot 55 and the first pivot 54 are arranged coaxially, and are connected to the two support arms 14 of the shell 10, respectively. In other embodiment, the first pivot 54 and the second pivot 55 may be integral.

Similarly, as shown in FIG. 12, a first vibration member 50 is arranged in a front end of the shell 10; and a second vibration member 52 is arranged in a branch 19 of the shell 10 which extends curvedly from a rear end of the moving space 12 of the shell 10 to an upper side of the massage member 30, for proving high-frequency vibration to enhance the stimulation effect. A control member 56 is mounted in the shell 10 and electrically connected to the rotary motor 20 and the vibration motors 50, 52 for controlling their operation, and a battery 58 is arranged in the shell 10 and electrically connected to the circuit board 56 for supplying electric power to the rotary motor 20 and the vibration motors 50, 52.

Figure 17:
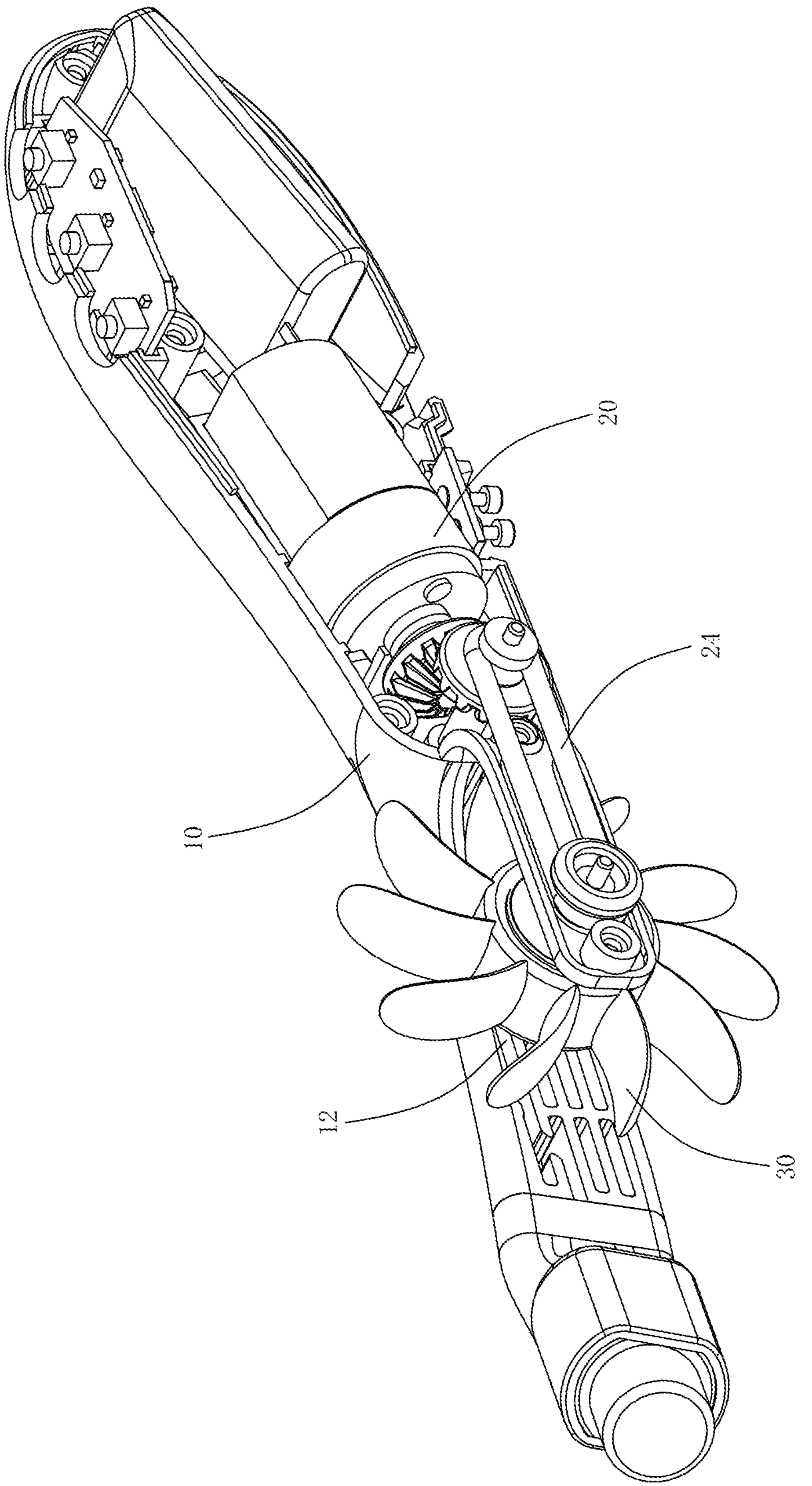
FIG. 17 is a schematic view of a massage device according to a third embodiment of the present application, wherein a portion of a shell is removed.
Figure 18:
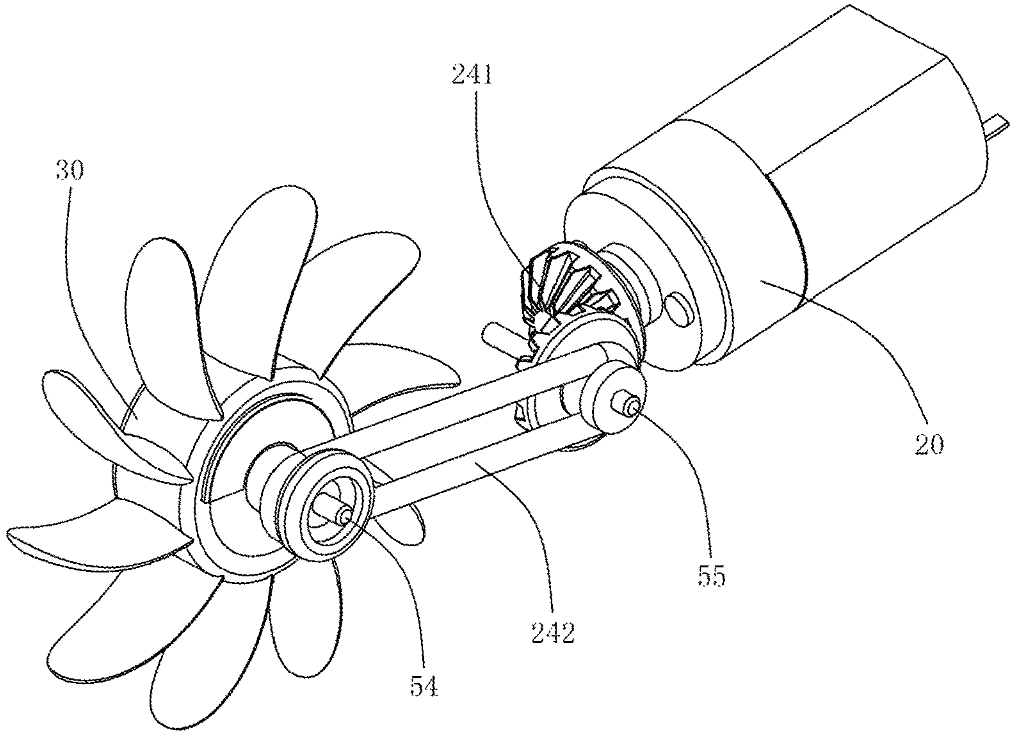
FIG. 18 is an isometric, assembled view of a massage module of the massage device of FIG. 17.
Figure 19:
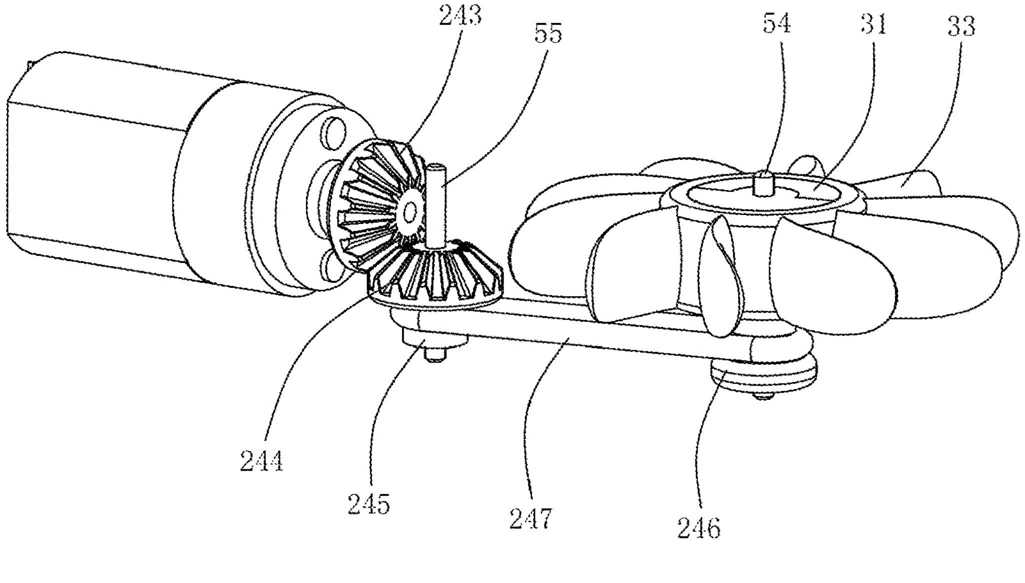
FIG. 19 shows the massage module of FIG. 18 from another aspect.
Figure 20:
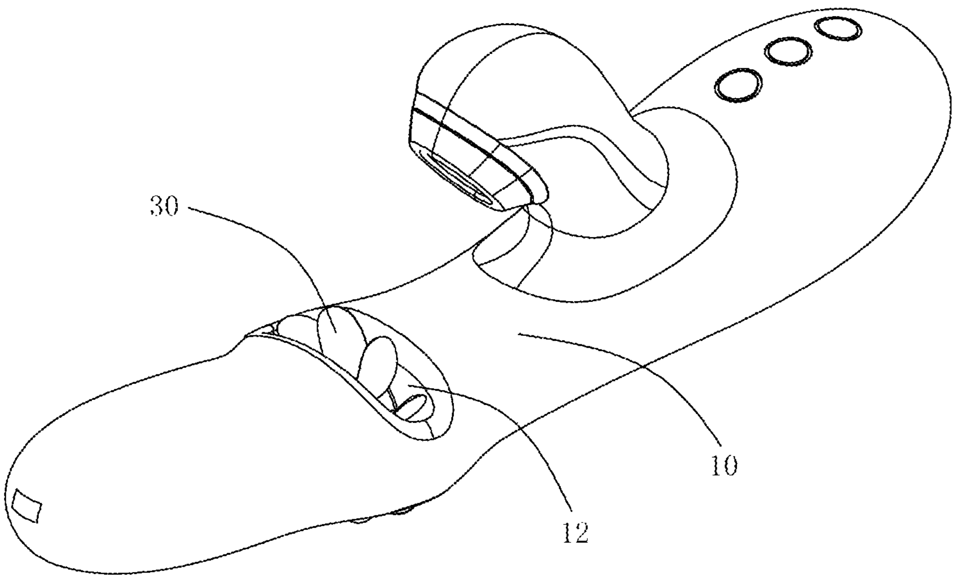
FIG. 20 is an isometric, assembled view of a massage device according to a fourth embodiment of the present application.
Figure 21:
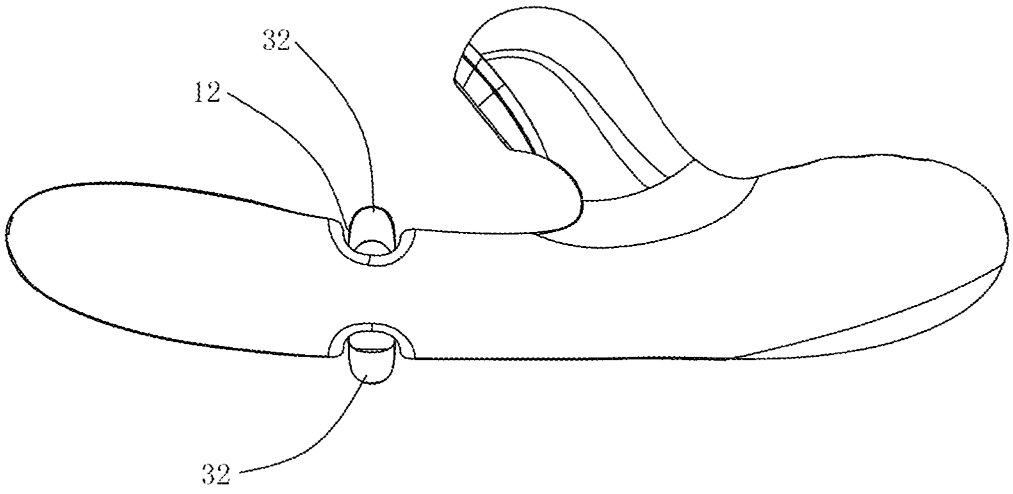
FIG. 21 is a side view of the massage device of FIG. 20.
Figure 22:
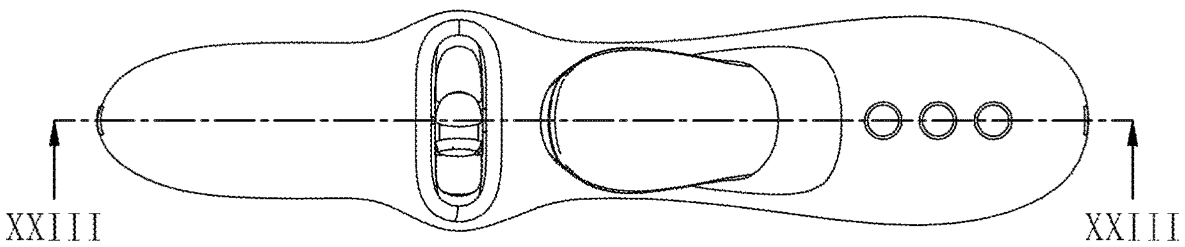
FIG. 22 is a top plan view of the massage device of FIG. 20.
Figure 23:
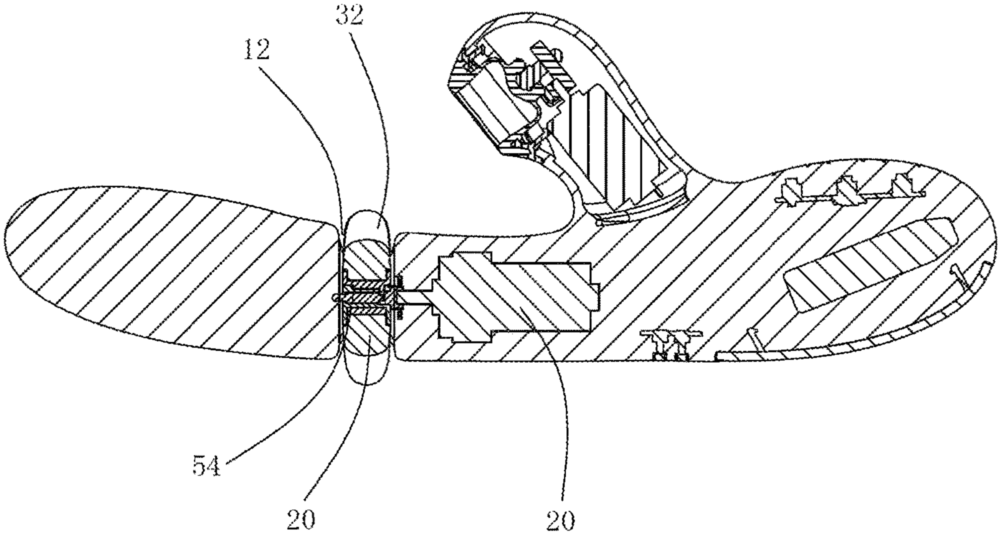
FIG. 23 is a cross sectional view of the massage device taken along line XXIII-XXIII of FIG. 22.

Referring to FIGS. 17-19, a massage device according to a third embodiment is shown, which is the same as that of the second embodiment except the transmission unit 24.

In this embodiment, as shown in FIG. 18 and FIG. 19, the transmission unit 24 includes a gear unit 241 and a pulley unit 242. The gear unit 241 includes a first gear 243 and a second gear 244 which are meshed with each other, preferably the first gear 243 and second gear 244 are bevel gears. The pulley unit 242 includes a drive pulley 245, a driven wheel 246 and a belt 247 interconnecting the drive pulley 245 and driven wheel 246. The first gear 243 is connected to the rotary shaft 21 of the rotary motor 20, the second gear 244 is connected to the drive pulley 244, the driven wheel 246 is connected to the hub 31 of the massage member 30, and the hub 31 is rotatably connected to the shell 10 by a first pivot 54.

During operation, the driving member 20 is started and thus the massage member 30 is driven to rotate about the first pivot 54 through the transmission unit 24, the blade 33 of the massage member 30 may rotate to be totally accommodated inside the moving space 12, or may rotate to make the massage portion 32 thereof extend beyond the moving space 12 to the outside environment. That is, the massage portions 32 of the blades 33 of the rotary massage member 30 scratch the part of the human body nestled to the outer surface of the shell 10 sequentially, such as scratch the vaginal wall of the women, thereby generating stimulation effect to help the women to release their sexual pressure. In some cases, the message device may be inserted into the anus and rectum, and thus the massage device may be applied not only to women, but also to men.

In this embodiment, the drive pulley 244 and the second gear 244 are coaxial, and the driven wheel 246 and the hub 31 are coaxial. The hub 31 and the driven wheel 246 are rotatably connected to the shell 10 by the first pivot 54, and the second gear 244 and the drive pulley 244 are rotatably connected to the shell 10 by a second pivot 55, wherein the second pivot 55 is parallel to the first pivot 54. By means of the transmission unit 24, long-distance power transmission can be achieved, and thus the driving member 20 and the massage member 30 can be set at different positions, such as the massage member 30 inside the moving space 12 while the driving member 20 out of the moving space 12.

Referring to FIGS. 20-23, a massage device according to a fourth embodiment is shown. In this embodiment, the massage device includes a shell 10 defining a moving space 12 therein, a massage member 30 constructed as an impeller and rotatably accommodated in the moving space 12 by a pivot 54, and a driving member 20 mounted in the shell 10 and connected to the massage member 30 in a transmission way. The moving space 12 extends laterally through two opposite sides of the shell 10, and massage portions 32 of the massage member 30 can rotate to the outside environment. A difference between the massage member 30 of this embodiment and that of the second embodiment is mainly in that: the pivot 54 extends substantially along a longitudinal direction of the shell 10.

Referring to FIGS. 24-29, some embodiments of the massage member 30 are shown.

Figure 24:
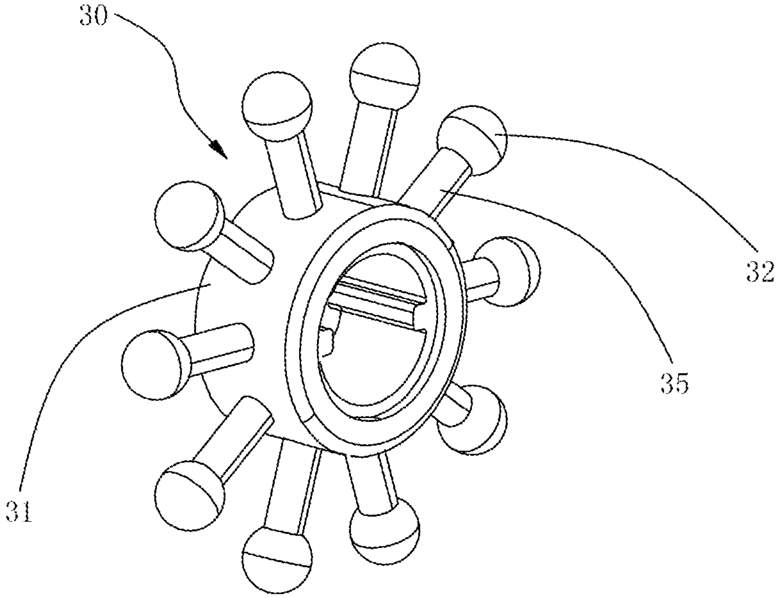
FIG. 24 is an alternative embodiment of a massage member of the massage device of the present application.
Figure 25:
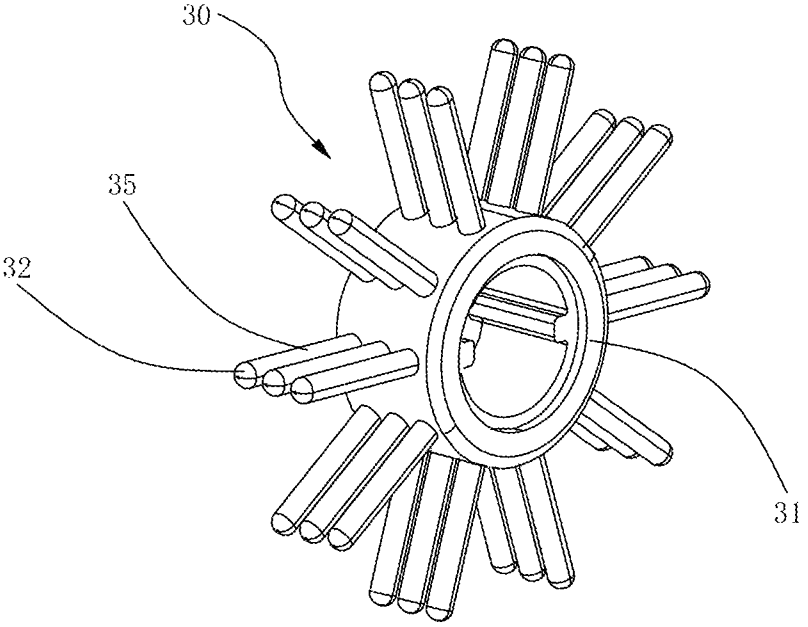
FIG. 25 is a schematic view of the massage member according to a third embodiment.

In FIG. 24, the massage member 30 includes a hub 31 and a plurality of columns 35 extending radially from the hub 31, and a massage portion 32 is formed at a free end of each column 35. In this embodiment, the massage portion 32 is configured as a ball, and has a diameter lager than that of the column 35. In FIG. 25, the massage member 30 includes a hub 31 and a plurality of columns 35 extending radially from the hub 31. A massage portion 32 is formed at a free end of each column 35, and is generally dome-shaped. The columns 35 may be one circle (such as FIG. 24) or multiple circles (such as FIG. 25).

Figure 26:
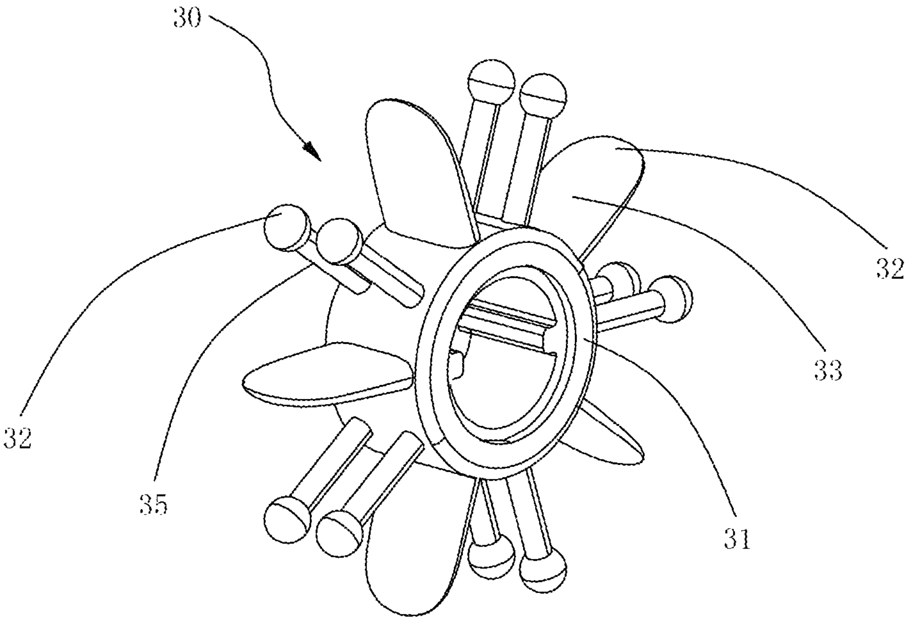
FIG. 26 is a schematic view of the massage member according to a fourth embodiment.
Figure 27:
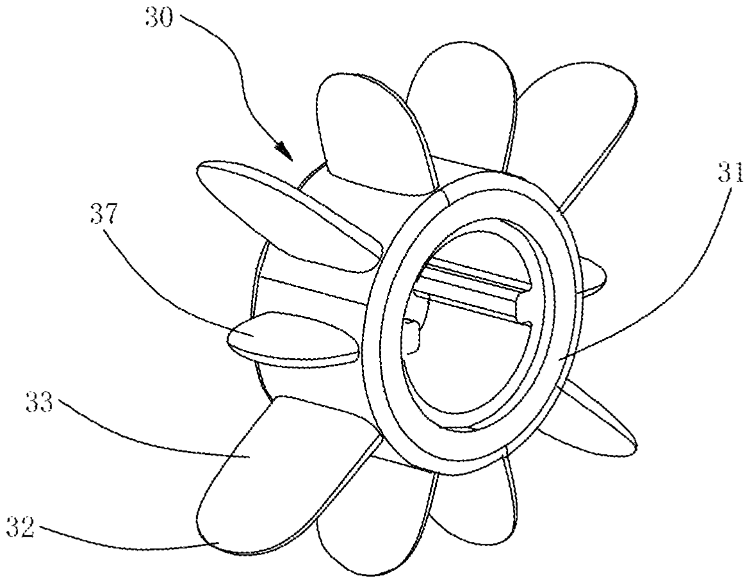
FIG. 27 is a schematic view of the massage member according to a fifth embodiment.

In FIG. 26, the massage member 30 includes a hub 31, a plurality of blades 33 and a plurality of columns 35. The blades 33 and columns 35 are arranged around the hub 31, and are alternately along a circumferential direction of the hub 31. The free end of each blade 33 is configured as a massage portion 32, and the free end of each column 35 is configured as a massage portion 32. In FIG. 27, the massage member 30 includes a hub 31, a plurality of first blades 33 and a plurality of second blades 37. The first blades 33 and second blades 37 are arranged around the hub 31, and are alternately along a circumferential direction of the hub 31. In this embodiment, the first blade 33 is longer than the second blade 37 in the radial direction, and the free end of first blade 33 is configured as a massage portion 32.

Figure 28:
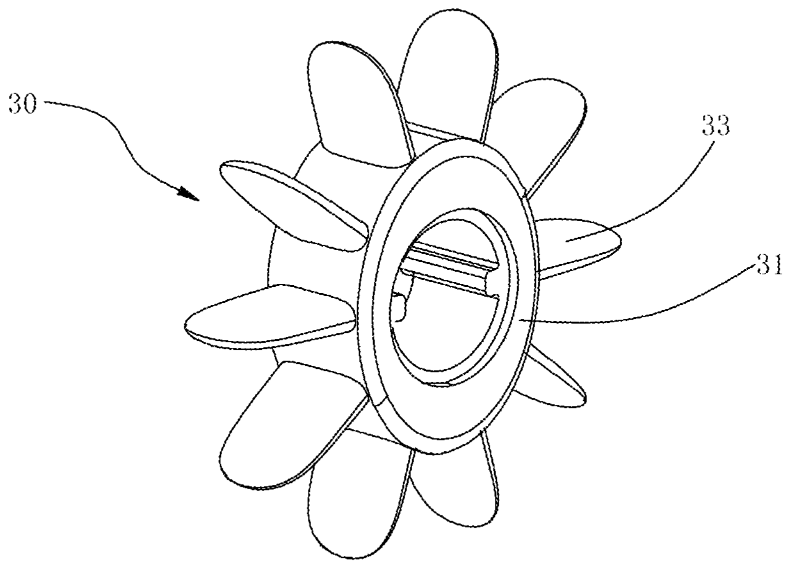
FIG. 28 is a schematic view of the massage member according to a sixth embodiment.
Figure 29:
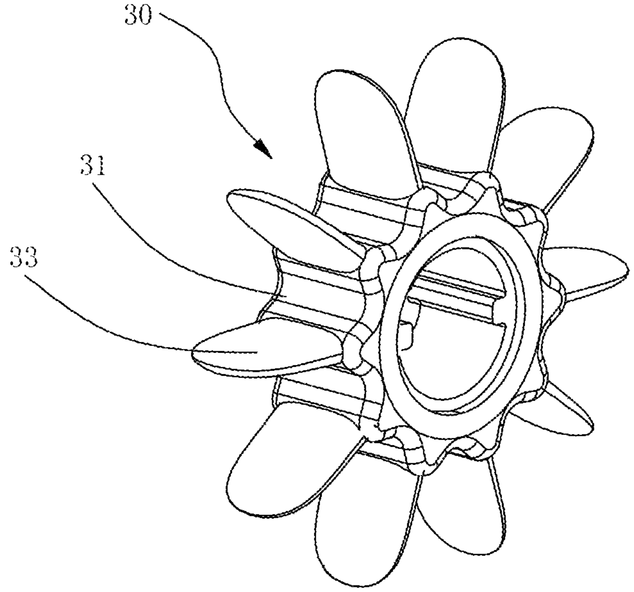
FIG. 29 is a schematic view of the massage member according to a seventh embodiment.

In FIG. 28, the massage member 30 includes a hub 31 and a plurality of blades 33 extending radially from the hub 31, and a massage portion 32 is formed at a free end of each blade 33. In this embodiment, an outer circumferential surface of the hub 31 is generally elliptical-shaped, and the radial length of the blades 33 may be different from each other. In FIG. 29, the massage member 30 includes a hub 31 and a plurality of blades 33 extending radially from the hub 31, and a massage portion 32 is formed at a free end of each blade 33. In this embodiment, an outer circumferential surface of the hub 31 is generally wave-shaped. It should be understood that the massage member 30, particularly the massage portions 32 may be configured as other shapes, as long as it can rotate into or out of the moving space 12 of the shell 10 to massage the human body around the shell 10.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

The invention claimed is:

1. A massage device, comprising:

a shell configured to be inserted into a human body, a moving space being defined in the shell and extending through a lateral wall of the shell to communicate with an outside environment out of the shell, the shell is elongated, and the moving space is defined in a middle portion of the shell, a front end portion of the shell extends from a front end of the moving space towards a front side of the massage device, wherein the front end portion is configured to be inserted into a vagina or a rectum of the human body during use;

a massage member being mounted in the moving space and rotatably connected to the shell by a pivot, the massage member comprising a plurality of massage portions arranged around the pivot; and a driving member arranged in the shell and connected to the massage member in a transmission way;

a first motor for providing a stimulation;

a branch extends curvedly from a rear end of the moving space of the shell to an upper side of the massage member by curvedly extending away from the shell and the moving space towards the front side of the massage device, and the first motor is arranged in the branch; and wherein when the massage member rotates about the pivot, the plurality of massage portions of the massage member rotates to the outside environment out of the space of the shell sequentially, so as to stimulate the vagina or the rectum of the human body around the shell, wherein the moving space and the massage member are located on the shell between the front end portion of the shell and the branch, wherein the massage member comprises a hub defining a hole at central portion of the hub for connecting the pivot, a plurality of blades and/or columns extends radially and outwardly from the hub, and the plurality of massage portions are formed by free ends of the plurality of blades and/or columns; the hub and the plurality of blades and/or columns are configured to rotate about the pivot to move the plurality of massage portions in and out of the moving space so as to have the plurality of massage portion contact a vaginal wall of the human body, and whereby, in use, when the front end portion of the shell is inserted in the vagina, the branch is configured to massage the clitoris of the human body via the stimulation provided by the first motor while the plurality of massage portions are configured to scratch the vaginal wall of the vagina.

2. The massage device according to claim 1, wherein the pivot extends along a lateral direction of the shell.

3. The massage device according to claim 1, wherein the moving space is closed along a circumferential of the moving space.

4. The massage device according to claim 3, wherein a vibration motor is accommodated at the front end portion of the shell.

5. The massage device according to claim 1, wherein the first motor is a first vibration motor.

6. The massage device according to claim 3, wherein the shell forms two support arms at two opposite lateral sides of the moving space, and the pivot is connected to the support arms.

7. The massage device according to claim 1, wherein the massage member in whole has a diameter larger than a depth of the moving space.

8. The massage device according to claim 7, wherein the moving space extends through two opposite lateral sides of the shell, and at least two of the plurality of massage portions extend beyond the moving space into the outside environment at each of the two opposite lateral sides of the shell.

9. The massage device according to claim 1, wherein the driving member is a rotary motor, and a transmission unit is connected between the rotary motor and the hub of the massage member.

10. The massage device according to claim 9, wherein the transmission unit comprises a first gear unit connected to the rotary motor and a second gear unit connected to the hub, and a connecting rod interconnects the first gear unit and the second gear unit.

11. The massage device according to claim 10, wherein the first gear unit comprises two spur gears which are meshed with each other, and the second gear unit comprises two bevel gears which are meshed with each other.

12. The massage device according to claim 9, wherein the transmission unit comprises a gear unit connected to the rotary motor and a pulley unit connected between the gear unit and the hub.

13. The massage device according to claim 12, wherein the gear unit comprises two bevel gears which are meshed with each other.

14. The massage device according to claim 13, wherein the pulley unit comprises a drive pulley, a driven wheel and a belt interconnecting the drive pulley and driven wheel, a first bevel gear of the two bevel gears is arranged to be coaxial with the rotary motor, a second bevel gear of the two bevel gears is arranged to be coaxial with the drive pulley, and the driven wheel is arranged to be coaxial with the hub.

15. The massage device according to claim 1, wherein the plurality of blades comprise a plurality of first blades and a plurality of second blades, the plurality of first blades and second blades are alternately positioned along a circumferential direction of the hub such that a blade of the plurality of first blades is positioned between two respective blades of the plurality of second blades and a blade of the plurality of second blades is positioned between two respective blades of the plurality of first blades, wherein each of the plurality of first blades comprises a different in radial size compared to each of the plurality of second blades, the plurality of massage portions are formed by free ends of the plurality of first blades and second blades.

16. The massage device according to claim 1, wherein the plurality of blades and columns are alternately positioned along a circumferential direction of the hub such that a blade of the plurality of blades is positioned between two respective columns of the plurality of columns and a column of the plurality of columns is positioned between two respective blades of the plurality of blades, the plurality of massage portions are formed by free ends of the plurality of blades and columns.

* * * * *